United States Patent
Liou et al.

(10) Patent No.: US 10,893,431 B2
(45) Date of Patent: Jan. 12, 2021

(54) METHOD AND APPARATUS FOR BEAM FAILURE REPORTING UNDER MULTICELL CONFIGURATION IN A WIRELESS COMMUNICATION SYSTEM

(71) Applicant: ASUSTek Computer Inc., Taipei (TW)

(72) Inventors: Jia-Hong Liou, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/251,843

(22) Filed: Jan. 18, 2019

(65) Prior Publication Data
US 2019/0230545 A1 Jul. 25, 2019

Related U.S. Application Data

(60) Provisional application No. 62/619,320, filed on Jan. 19, 2018.

(51) Int. Cl.
*H04W 24/10* (2009.01)
*H04W 16/28* (2009.01)
*H04W 74/08* (2009.01)

(52) U.S. Cl.
CPC .......... *H04W 24/10* (2013.01); *H04W 16/28* (2013.01); *H04W 74/0866* (2013.01)

(58) Field of Classification Search
None
See application file for complete search history.

(56) References Cited

U.S. PATENT DOCUMENTS

| 2017/0055191 | A1 | 2/2017 | Shinada | |
|---|---|---|---|---|
| 2018/0288645 | A1 | 10/2018 | Lee | |
| 2019/0132066 | A1* | 5/2019 | Park | H04W 36/0094 |
| 2019/0215048 | A1* | 7/2019 | Cirik | H04B 7/0626 |
| 2019/0253949 | A1* | 8/2019 | Park | H04W 36/305 |

FOREIGN PATENT DOCUMENTS

| WO | 2018147665 | 8/2018 | | |
|---|---|---|---|---|
| WO | WO-2019135654 A1 * | 7/2019 | | H04L 5/0035 |

\* cited by examiner

*Primary Examiner* — Rebecca E Song
(74) *Attorney, Agent, or Firm* — Skaar Ulbrich Macari, P.A.

(57) ABSTRACT

A method and apparatus are disclosed from the perspective of a User Equipment (UE). In one embodiment, the method includes the UE being served and/or configured with a first cell and a second cell. The method also includes the UE transmitting a beam failure recovery request via a PRACH (Physical Random Access Channel) in the second cell in response to the UE detecting that all links associated with monitored control resource set(s) in the second cell have failed. Furthermore, the method includes the UE transmitting a first report via a PUCCH (Physical Uplink Control Channel) in the second cell in response to the UE detecting that all links associated with monitored control resource set(s) in the first cell have failed.

20 Claims, 21 Drawing Sheets

(a) Digital beamforming (b) Analogue beamforming (c) Hybrid beamforming: Left = fully connected, Right = sub-array

METHOD AND APPARATUS FOR BEAM FAILURE REPORTING UNDER MULTICELL CONFIGURATION IN A WIRELESS COMMUNICATION SYSTEM

CROSS-REFERENCE TO RELATED APPLICATIONS

The present Application claims the benefit of U.S. Provisional Patent Application Ser. No. 62/619,320 filed on Jan. 19, 2018, the entire disclosure of which is incorporated herein in its entirety by reference.

FIELD

This disclosure generally relates to wireless communication networks, and more particularly, to a method and apparatus for beam failure reporting under multicell configuration in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of an User Equipment (UE). In one embodiment, the method includes the UE being served and/or configured with a first cell and a second cell. The method also includes the UE transmitting a beam failure recovery request via a PRACH (Physical Random Access Channel) in the second cell in response to the UE detecting that all links associated with monitored control resource set(s) in the second cell have failed. Furthermore, the method includes the UE transmitting a first report via a PUCCH (Physical Uplink Control Channel) in the second cell in response to the UE detecting that all links associated with monitored control resource set(s) in the first cell have failed.

DETAILED DESCRIPTION

Figure 1:
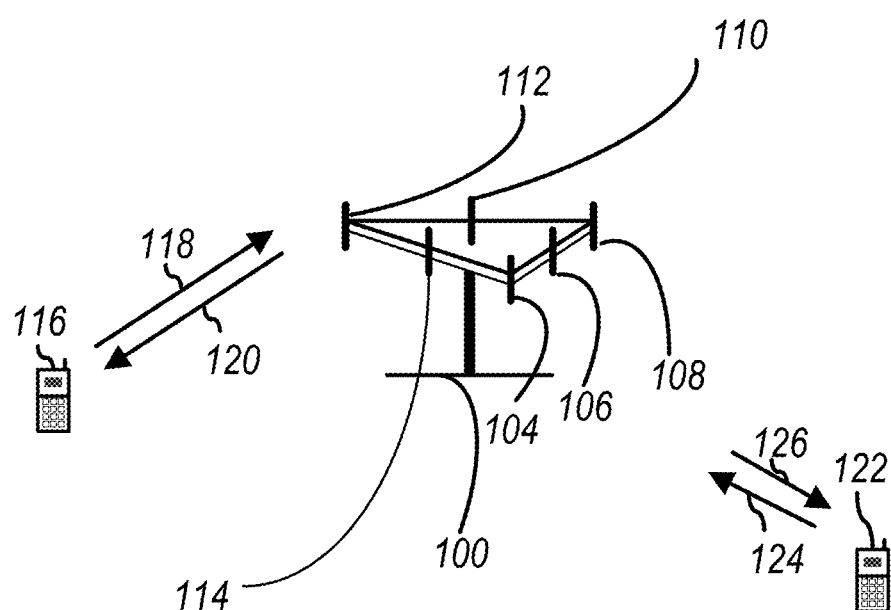
FIG. 1 shows a diagram of a wireless communication system according to one exemplary embodiment.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis#23][NR] Deployment scenarios", NTT DOCOMO; 3GPP RAN2#94 meeting minute; R2-162251, "RAN2 aspects of high frequency New RAT", Samsung; Final Report of 3GPP TSG RAN WG1 #85 v1.0.0 (Nanjing, China, 23-27 May 2016); Final Report of 3GPP TSG RAN WG1 #86 v1.0.0 (Gothenburg, Sweden, 22-26 Aug. 2016); Final Report of 3GPP TSG RAN WG1 #86bis v1.0.0 (Lisbon, Portugal, 10-14 Oct. 2016); Final Report of 3GPP TSG RAN WG1 #87 v1.0.0 (Reno, USA, 14-18 Nov. 2016); Final Report of 3GPP TSG RAN WG1 #AH1_NR v1.0.0 (Spokane, USA, 16-20 Jan. 2017); Final Report of 3GPP TSG RAN WG1 #88 v1.0.0 (Athens, Greece, 13-17 Feb. 2017); Final Report of 3GPP TSG RAN WG1 #88bis v1.0.0 (Spokane, USA, 3-7 Apr. 2017); Final Report of 3GPP TSG RAN WG1 #89 v1.0.0 (Hangzhou, China, 15-19 May 2017); Final Report of 3GPP TSG RAN WG1 #AH _NR2 v1.0.0 (Qingdao, China, 27-30 Jun. 2017); Final Report of 3GPP TSG RAN WG1 #90 v1.0.0 (Prague, Czech Rep, 21-25 Aug. 2017); Final Report of 3GPP TSG RAN WG1 #AH_NR3 v1.0.0 (Nagoya, Japan, 18-21 Sep. 2017); Final Report of 3GPP TSG RAN WG1 #90bis v1.0.0 (Prague, Czech Rep, 9-13 Oct. 2017); Final Chairman's Note of 3GPP TSG RAN WG1 Meeting #91 (Reno, USA, 27 Nov.-1 Dec. 2017) (updated with email approvals); R1-1710539, "On QCL for different BW parts and other QCL details", Intel Corporation; R1-1800242, "Remaining issues on DL beam recovery", CATT; R1-1800734, "Remaining issues on beam management", InterDigital, Inc.; R2-163879, "RAN2 Impacts in HF-NR", MediaTeK; R2-162210, "Beam level management <-> Cell level mobility", Samsung; and R2-163471, "Cell concept in NR", CATT. The standards and documents listed above are hereby expressly incorporated by reference in their entirety.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
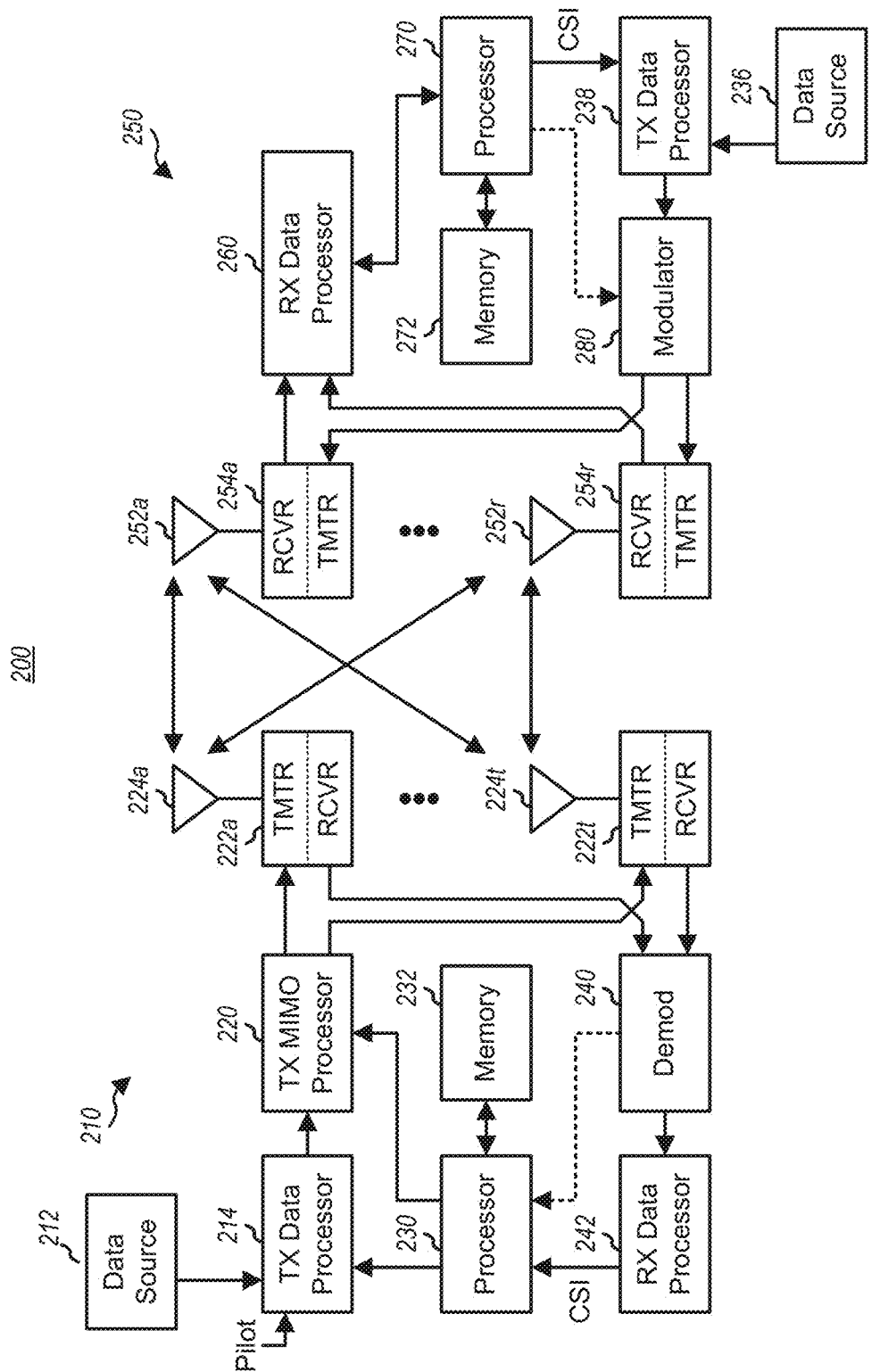
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
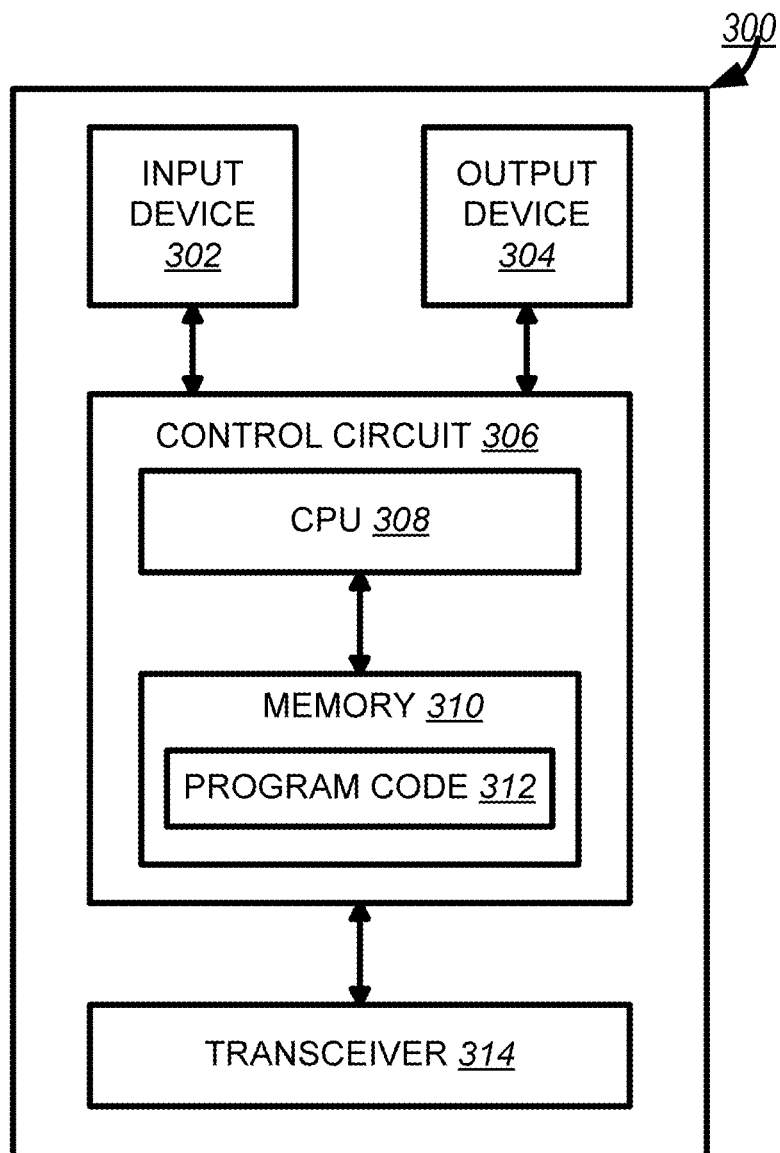
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
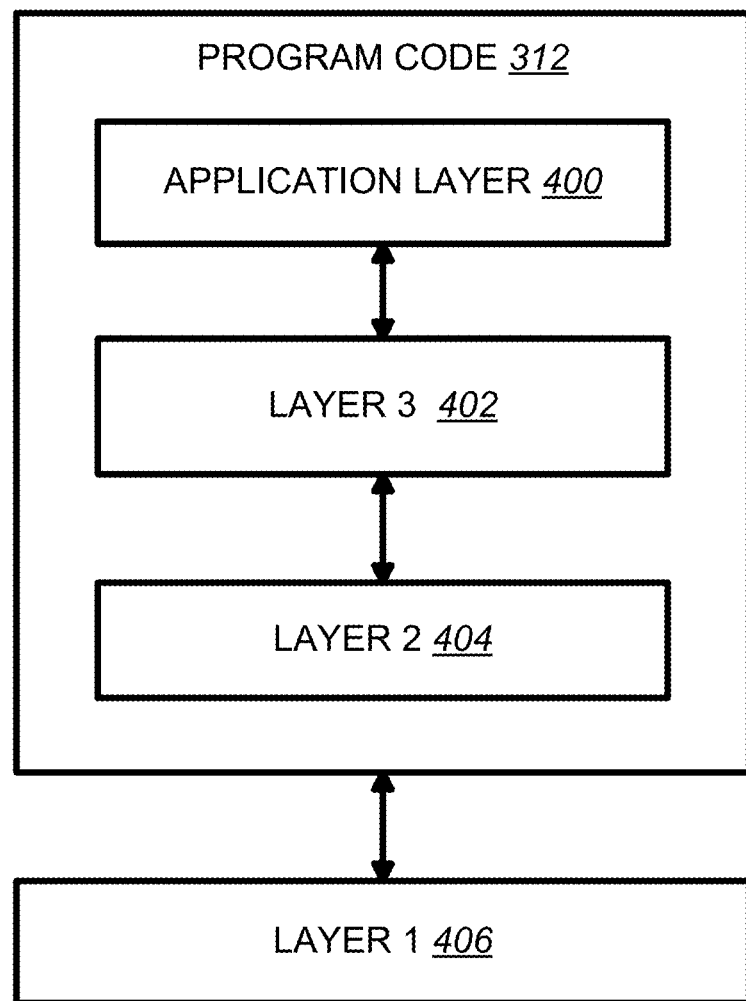
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:
  eMBB (enhanced Mobile Broadband)
  mMTC (massive Machine Type Communications)
  URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g., current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams being narrow compared to a wide sector beam, multiple beams for transmitting downlink common channels are needed to cover the required cell area. The number of concurrent high gain beams that access point is able to form may be limited by the cost and complexity of the utilized transceiver architecture. In practice, in higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be generally categorized into three types of implementation: digital beamforming, hybrid beamforming, and analog beamforming. For digital beamforming, the beam is generated on the digital domain, i.e. the weighting of each antenna element can be controlled by baseband (e.g. connected to a TXRU (Transceiver Units)). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

For Analog beamforming, the beam is generated on the analog domain, i.e. the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beams generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain.

Figure 5A:
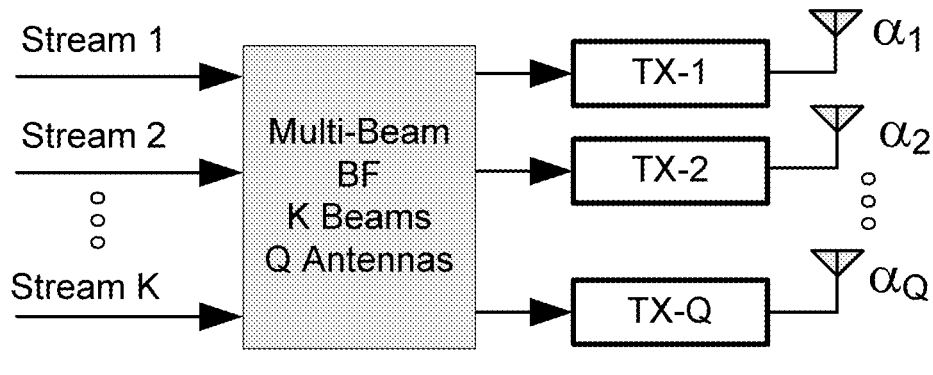
FIGS. 5A-5C provide exemplary illustrations of three types of beamforming.
Figure 5B:
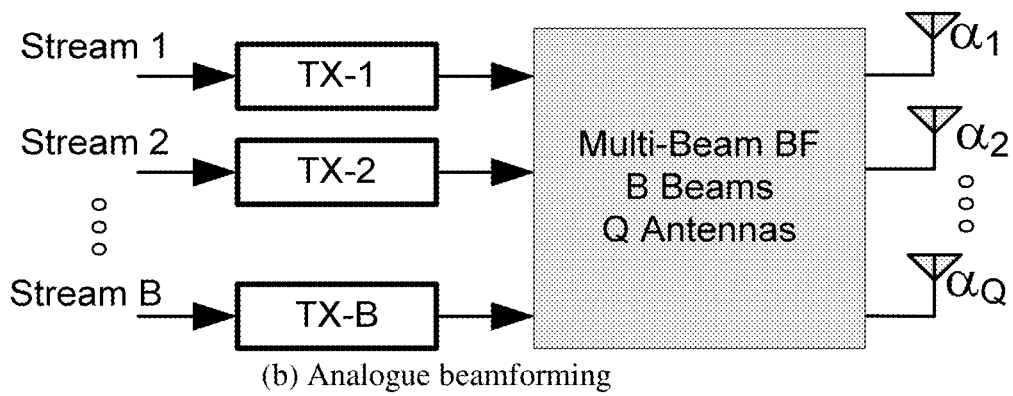
Figure 5C:
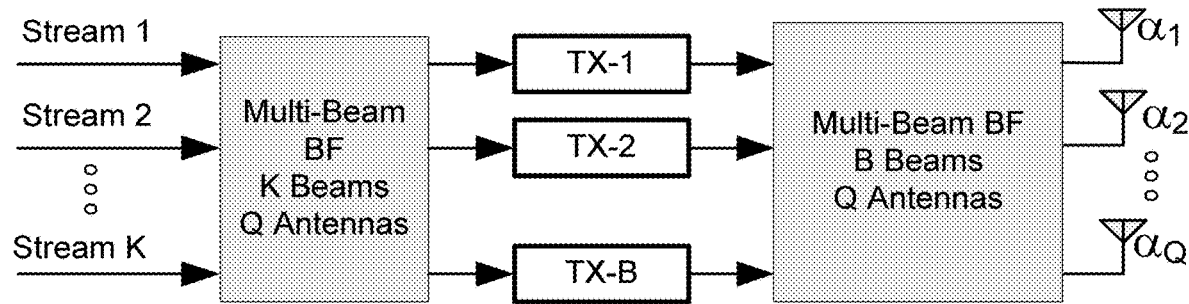
Figure 5C:
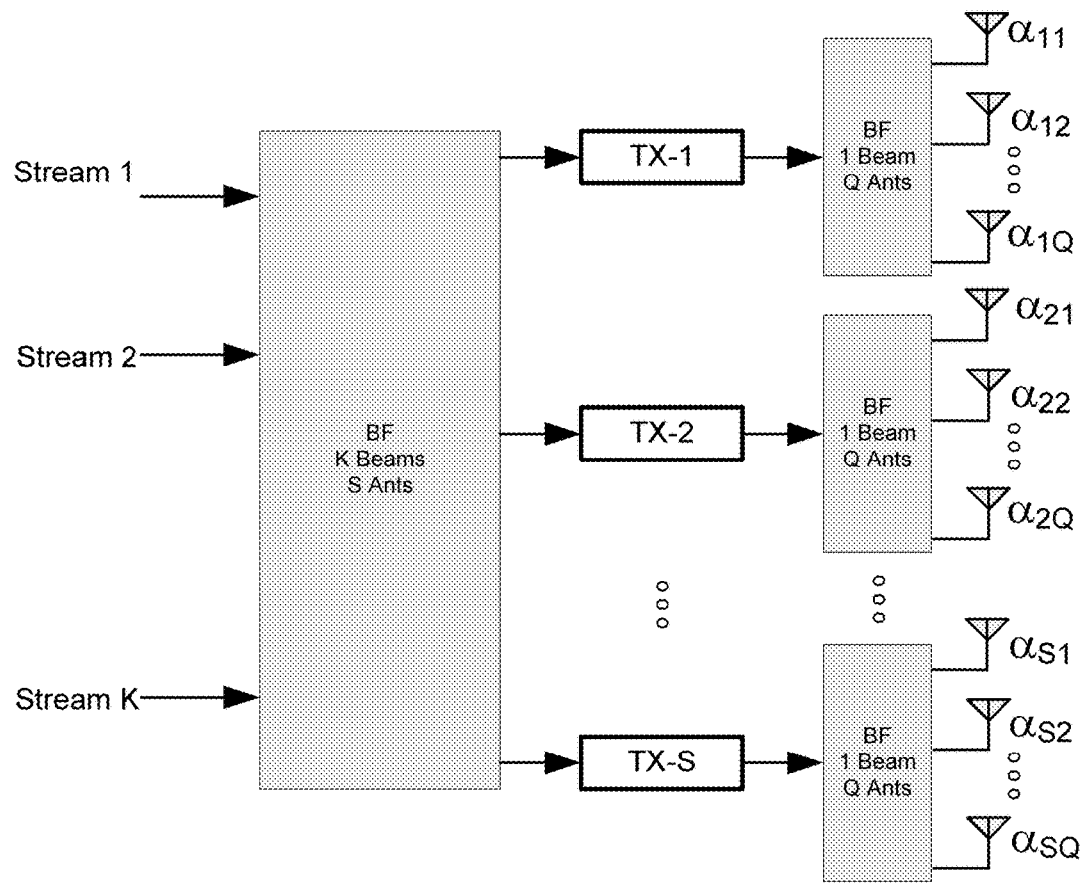

FIGS. 5A-5C provide exemplary illustrations of the three types of beamforming.

Figure 6:
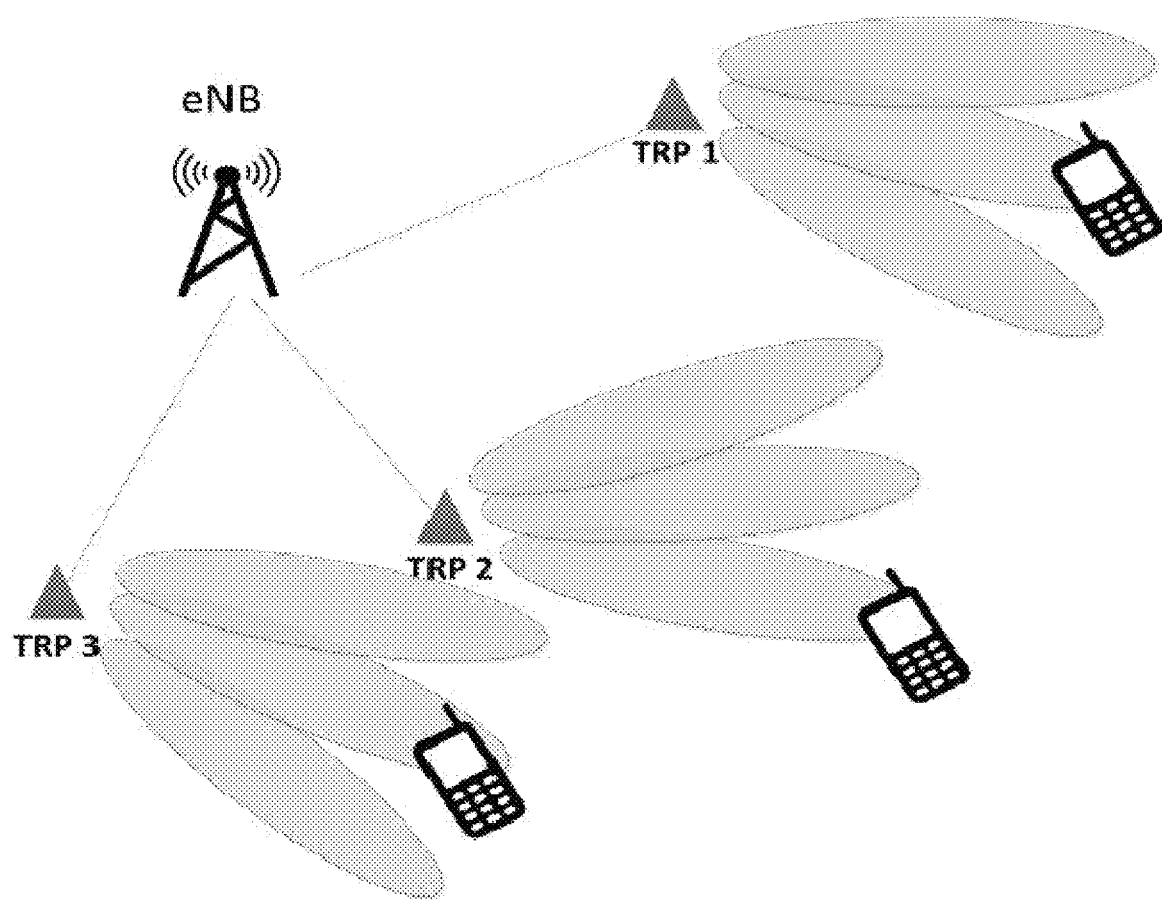
FIG. 6 is a reproduction of FIG. 1 of 3GPP R2-162709.

Based on 3GPP R2-162709 and as shown in FIG. 6, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR can be listed as follows:
Intra-TRP mobility
Inter-TRP mobility
Inter-NR eNB mobility Based on 3GPP R2-162762, reliability of a system purely relying on beamforming and operating in higher frequencies might be challenging, since the coverage might be more sensitive to both time and space variations. As a consequence of that the SINR (Signal to Interference Plus Noise Ratio) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Figure 7:
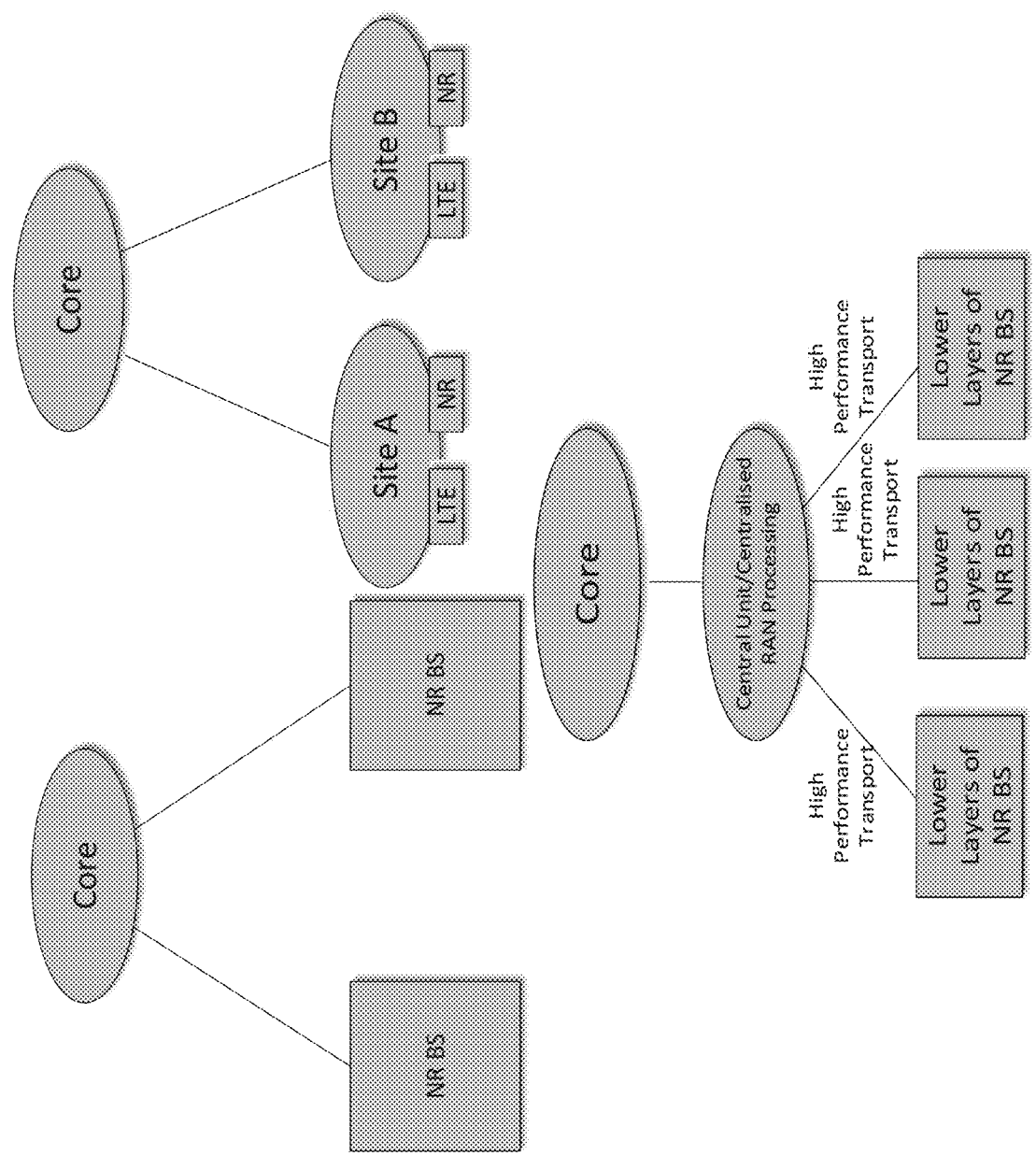
FIGS. 7 and 8 are reproduction of figures of 3GPP R2-160947.
Figure 8:
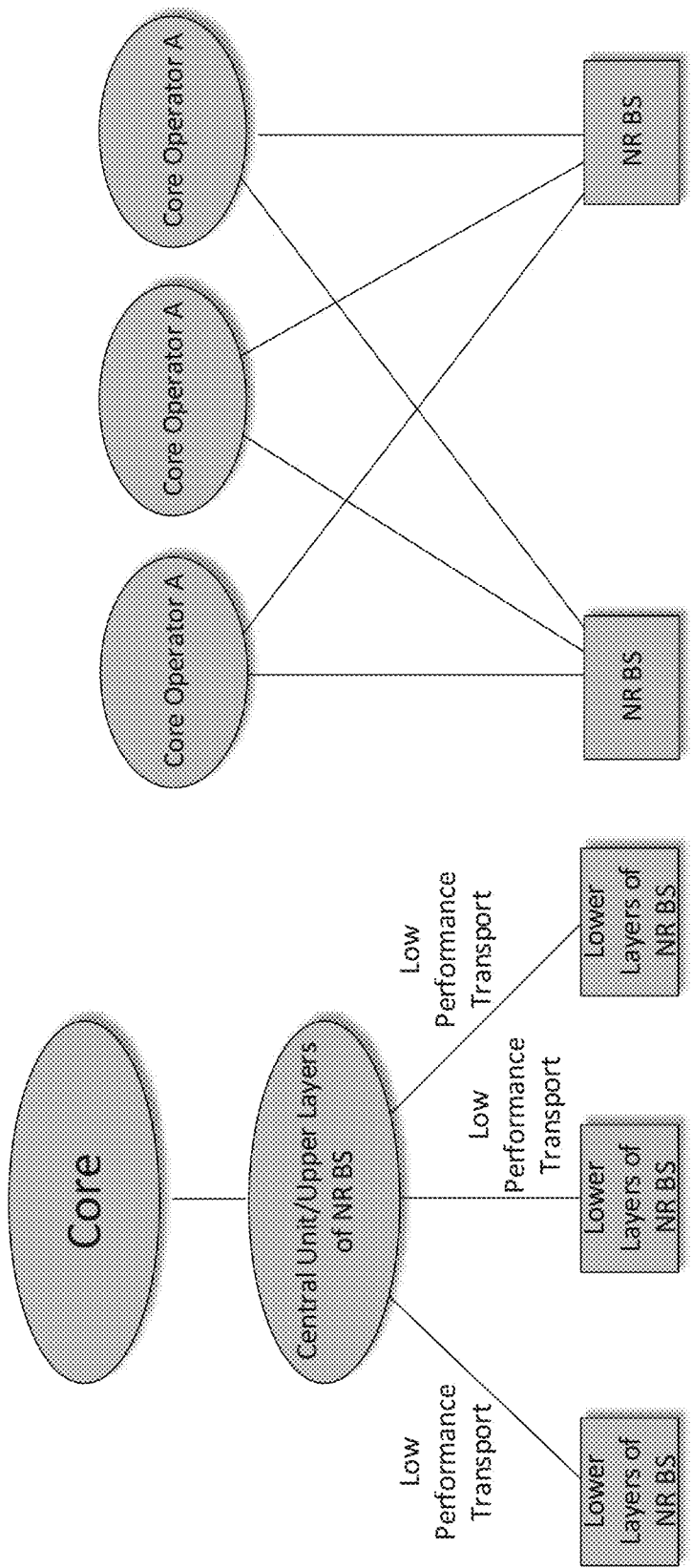

Based on 3GPP R3-160947, the scenarios illustrated in FIGS. 7 and 8 should be considered for support by the NR radio network architecture.

Based on 3GPP R2-164306, the following scenarios in terms of cell layout for standalone NR are captured to be studied:
  Macro cell only deployment
  Heterogeneous deployment
  Small cell only deployment Based on 3GPP RAN2#94 meeting minutes, 1 NR eNB corresponds to 1 or many TRPs. Two levels of network controlled mobility:
  RRC driven at "cell" level.
  Zero/Minimum RRC involvement (e.g. at MAC/PHY)

Figure 9:
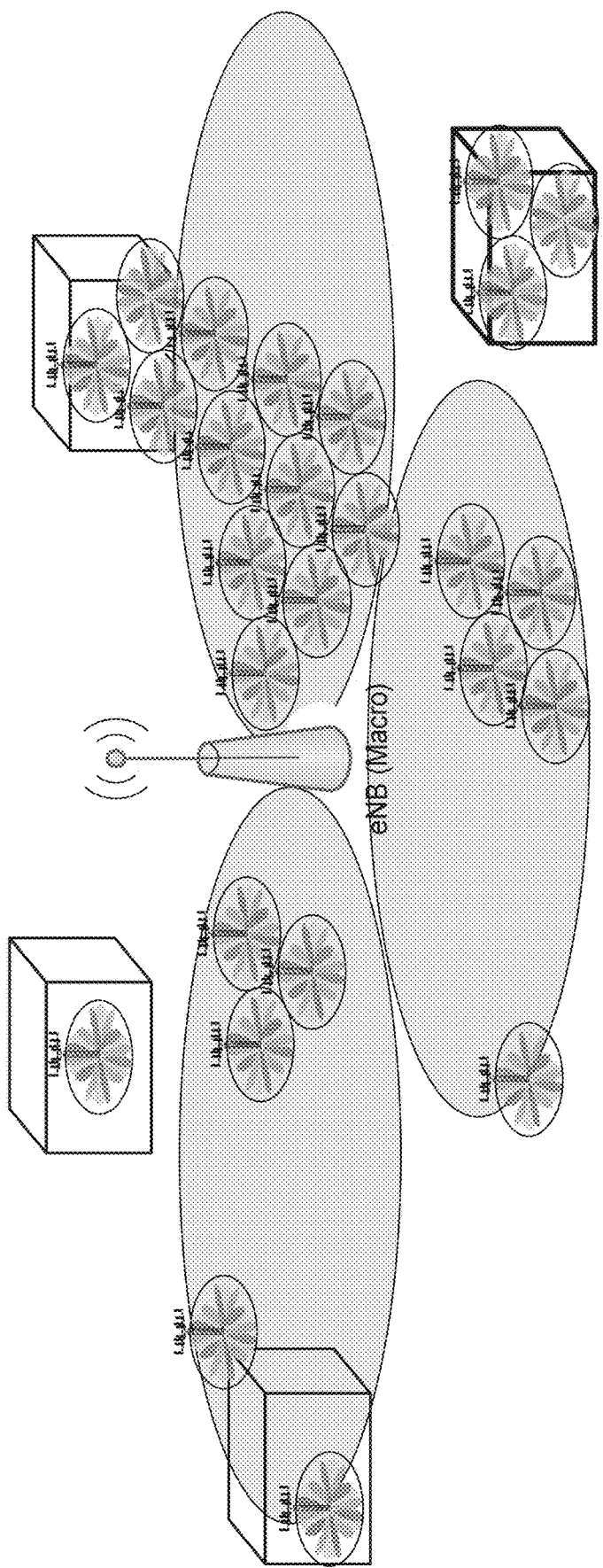
FIG. 9 shows an exemplary deployment with single TRP cell.
Figure 10:
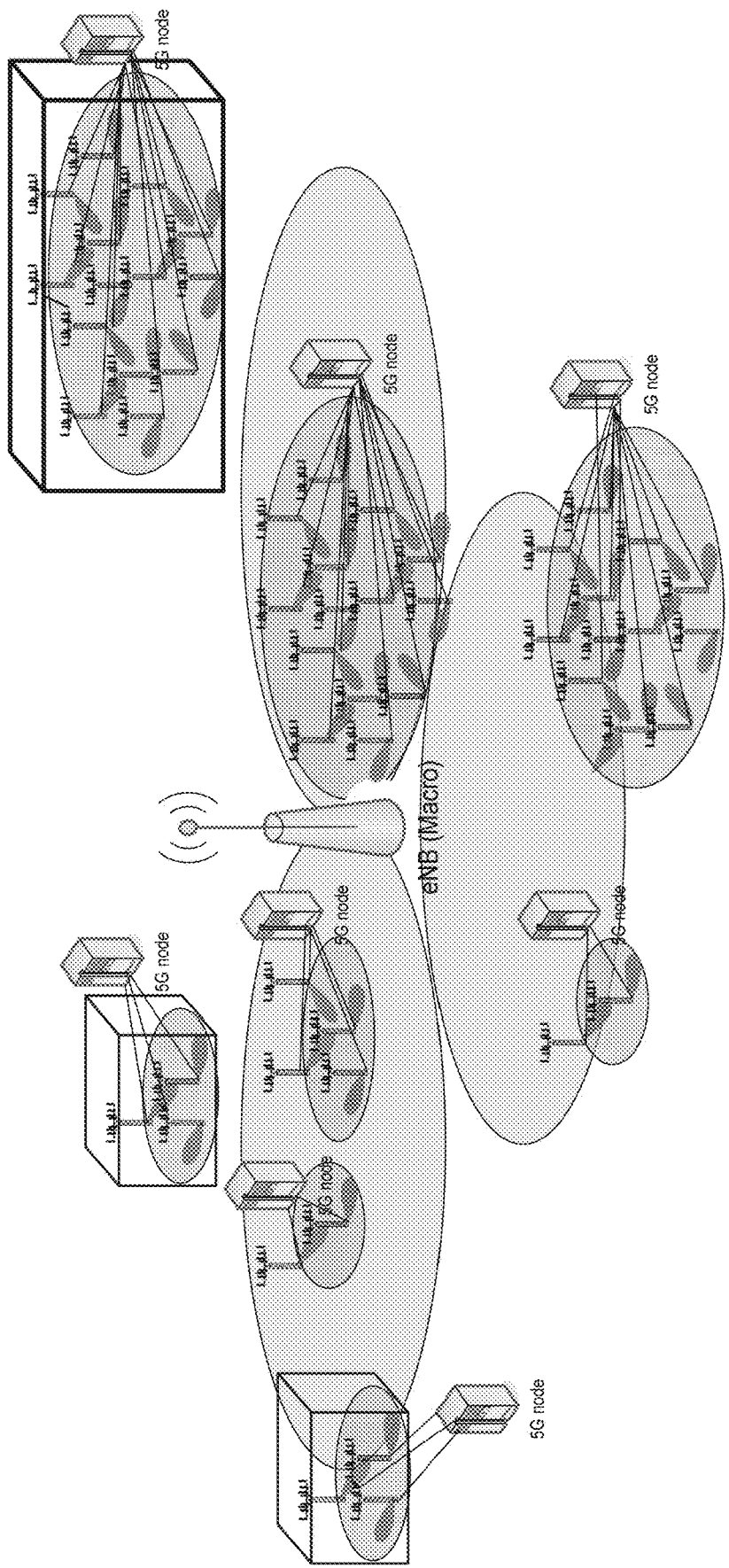
FIG. 10 shows an exemplary deployment with multiple TRP cells.
Figure 11:
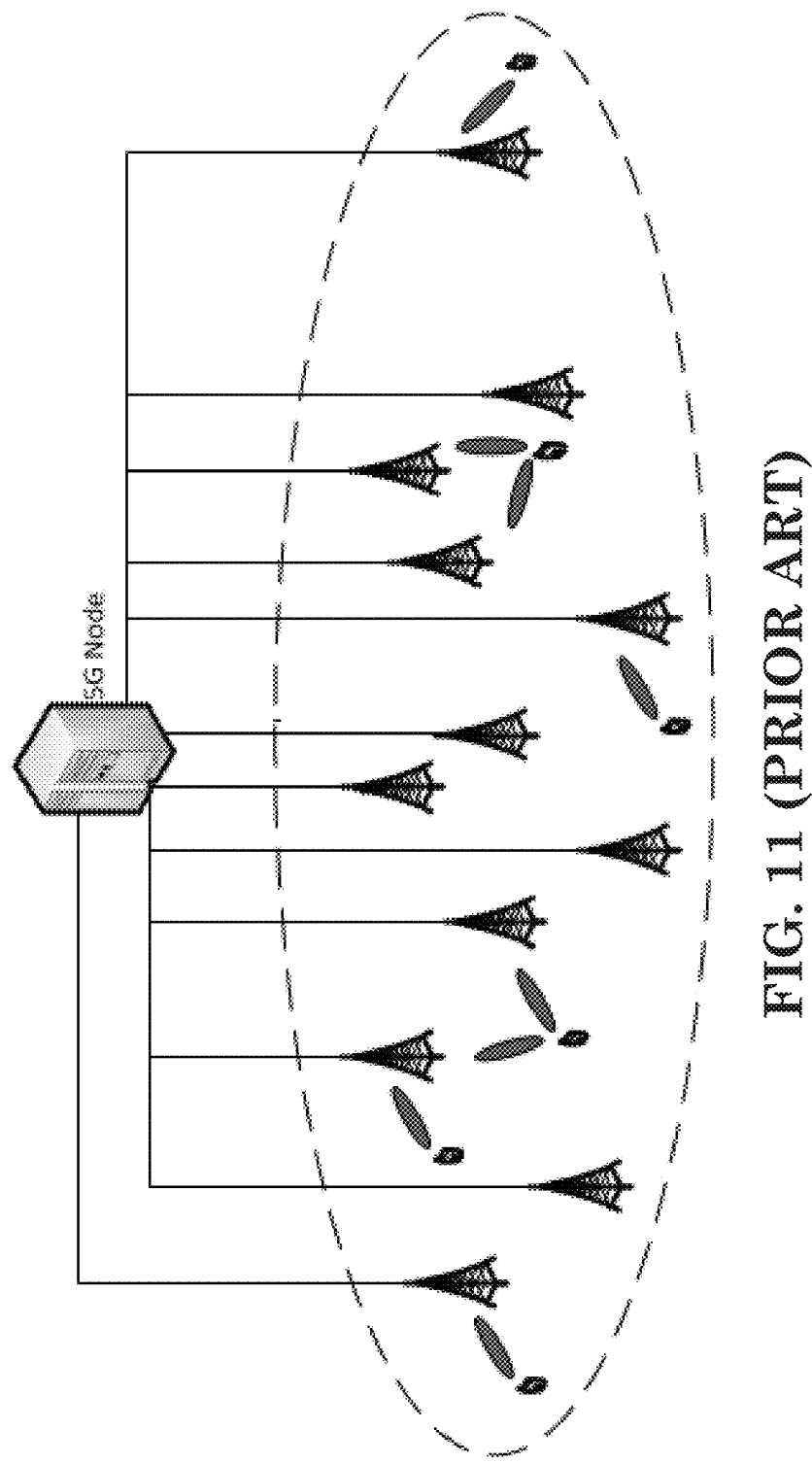
FIG. 11 shows an exemplary 5G cell comprising a 5G node with multiple TRPs.
Figure 12:
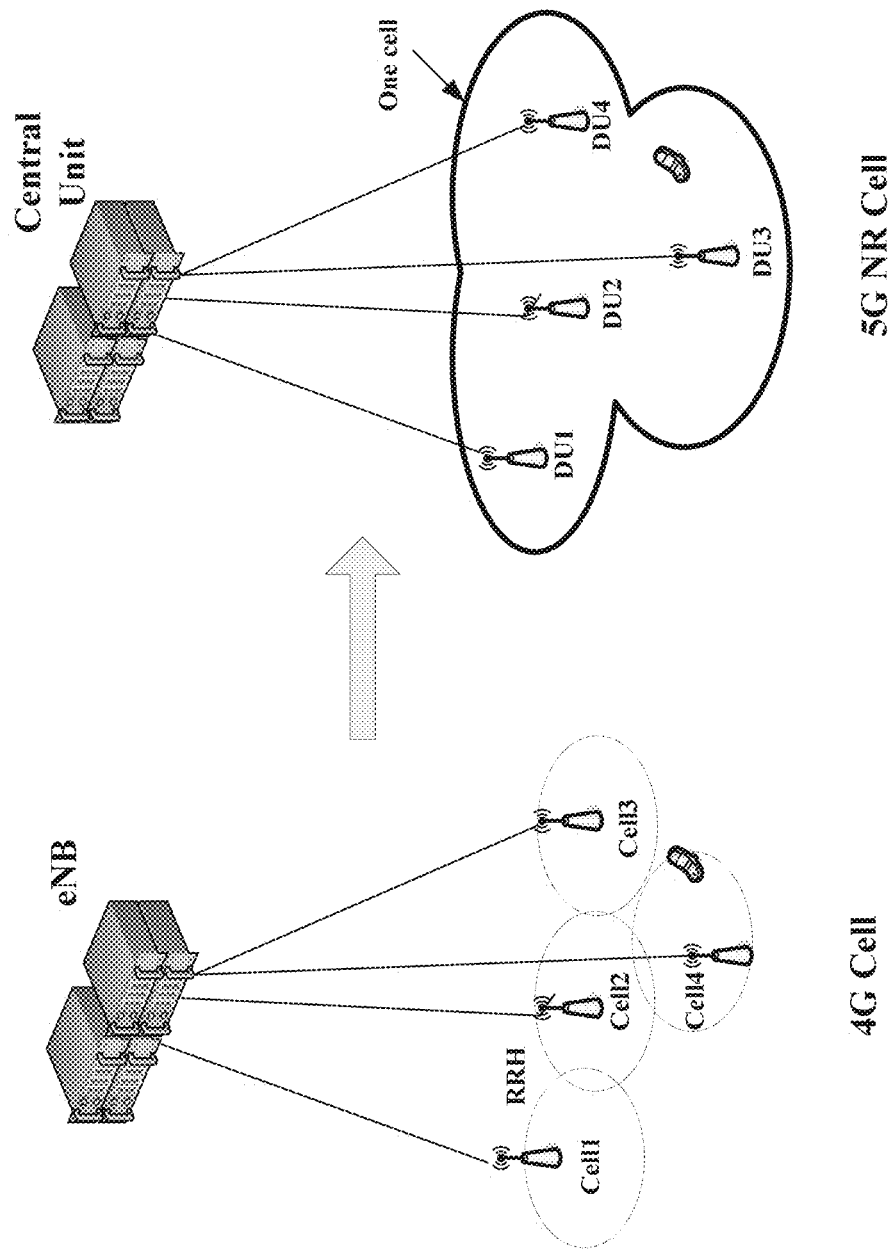
FIG. 12 shows an exemplary comparison between a LTE cell and a NR cell.

FIGS. 9 to 12 show some examples of the concept of a cell in 5G NR. FIG. 9 is a reproduction of a portion of FIG. 1 of 3GPP R2-163879, and shows exemplary different deployment scenarios with single TRP cell. FIG. 10 is a reproduction of a portion of FIG. 1 of 3GPP R2-163879, and shows exemplary different deployment scenarios with multiple TRP cells. FIG. 11 is a reproduction of FIG. 3 of 3GPP R2-162210, and shows an exemplary 5G cell comprising a 5G node with multiple TRPs. FIG. 12 is a reproduction of FIG. 1 of 3GPP R2-163471, and shows an exemplary comparison between a LTE cell and a NR cell.

There are some agreements on beam management in the RAN1 #85 meeting, as stated in the Final Report of 3GPP TSG RAN WG1 #85 v1.0.0 (Nanjing, China, 23-27 May 2016) as follows:
Agreements:
  Following three implementations of beamforming are to be studied in NR
    Analog beamforming
    Digital beamforming
    Hybrid beamforming
    Note: The physical layer procedure design for NR can be agnostic to UE/TRP with respect to the beamforming implementations employed at TRP/UE, but it may pursue beamforming implementation specific optimization not to lose efficiency
  RAN1 studies both multi-beam based approaches and single-beam based approaches for these channels/signals/measurement/feedback
    Initial-access signals (synchronization signals and random access channels)
    System-information delivery
    RRM measurement/feedback
    L1 control channel
    Note: The physical layer procedure design for NR can be unified as much as possible whether multi-beam or single-beam based approaches are employed at TRP at least for synchronization signal detection in stand-alone initial access procedure
    Note: single beam approach can be a special case of multi beam approach
    Note: Individual optimization of single beam approach and multiple beam approach is possible
  Multi-beam based approaches
    In Multi-beam based approaches, multiple beams are used for covering a DL coverage area and/or UL coverage distance of a TRP/a UE
    One example of multi-beam based approaches is beam sweeping:
      When beam sweeping is applied for a signal (or a channel), the signal (the channel) is transmitted/received on multiple beams, which are on multiple time instances in finite time duration
        Single/multiple beam can be transmitted/received in a single time instance
  Single-beam based approaches
    In single-beam based approaches, the single beam can be used for covering a DL coverage area and/or UL coverage distance of a TRP/a UE, similarly as for LTE cell-specific channels/RS There are some agreements on beam management in the RAN1 #86 meeting, as stated in the Final Report of 3GPP TSG RAN WG1 #86 v1.0.0 (Gothenburg, Sweden, 22-26 Aug. 2016) as follows:
Agreements:
  The following DL L1/L2 beam management procedures are supported within one or multiple TRPs:
    P-1: is used to enable UE measurement on different TRP Tx beams to support selection of TRP Tx beams/UE Rx beam(s)
      For beamforming at TRP, it typically includes a intra/inter-TRP Tx beam sweep from a set of different beams
      For beamforming at UE, it typically includes a UE Rx beam sweep from a set of different beams
      FFS: TRP Tx beam and UE Rx beam can be determined jointly or sequentially
    P-2: is used to enable UE measurement on different TRP Tx beams to possibly change inter/intra-TRP Tx beam(s)
      From a possibly smaller set of beams for beam refinement than in P-1
      Note: P-2 can be a special case of P-1
    P-3: is used to enable UE measurement on the same TRP Tx beam to change UE Rx beam in the case UE uses beamforming
  Strive for the same procedure design for Intra-TRP and inter-TRP beam management
    Note: UE may not know whether it is intra-TRP or inter TRP beam
  Note: Procedures P-2& P-3 can be performed jointly and/or multiple times to achieve e.g. TRP Tx/UE Rx beam change simultaneously
  Note: Procedures P-3 may or may not have physical layer procedure spec. impact
  Support managing multiple Tx/Rx beam pairs for a UE
  Note: Assistance information from another carrier can be studied in beam management procedures
  Note that above procedure can be applied to any frequency band Note that above procedure can be used in single/multiple beam(s) per TRP Note: multi/single beam based initial access and mobility treated within a separate RAN1 agenda item R1-168468 Definitions Supporting Beam Related Procedures Nokia, Qualcomm, CATT, Intel, NTT DoCoMo, Mediatek, Ericsson, ASB, Samsung, LGE

---

{
* Beam management = a set of L1/L2 procedures to acquire and maintain a set of TRP(s) and/or UE beams that can be used for DL and UL transmission/reception, which include at least following aspects:
  ○ Beam determination= for TRP(s) or UE to select of its own Tx/Rx beam(s).
  ○ Beam measurement = for TRP(s) or UE to measure characteristics of received beamformed signals
  ○ Beam reporting = for UE to report information a property/quality of of beamformed signal(s) based on beam measurement
  ○ Beam sweeping = operation of covering a spatial area, with beams transmitted and/or received during a time interval in a predetermined way.
}

---

There are some agreements on beam management in the RAN1 #86bis meeting, as stated in the Final Report of 3GPP TSG RAN WG1 #86bis v1.0.0 (Lisbon, Portugal, 10-14 Oct. 2016) as follows:

Working Assumptions:
  Beam management procedures can utilize at least the following RS type(s):
    RS defined for mobility purpose at least in connected mode
      FFS:RS can be NR-SS or CSI-RS or newly designed RS
      Others are not precluded
    CSI-RS:
      CSI-RS is UE-specifically configured
        Multiple UE may be configured with the same CSI-RS
      The signal structure for CSI-RS can be specifically optimized for the particular procedure
        Note: CSI-RS can also be used for CSI acquisition
    Other RS could also be considered for beam management such as DMRS and synchronization signals
[ . . . ]
Agreements:
  For downlink, NR supports beam management with and without beam-related indication
    When beam-related indication is provided, information pertaining to UE-side beamforming/receiving procedure used for data reception can be indicated through QCL to UE
      FFS: Information other than QCL
[ . . . ]
  For downlink, based on RS (used for beam management) transmitted by TRP, UE reports information associated with N selected Tx beams
    Note: N can be equal to 1
[ . . . ]
Agreements:
  Support at least network triggered aperiodic beam reporting:
    Aperiodic beam reporting is supported under P-1, P-2, and P-3 related operations
[ . . . ]
Agreements:
  UL beam management is to be further studied in NR
    Similar procedures can be defined as DL beam management with details FFS, e.g.:
      U-1: is used to enable TRP measurement on different UE Tx beams to support selection of UE Tx beams/TRP Rx beam(s)
        Note: this is not necessarily useful in all cases
      U-2: is used to enable TRP measurement on different TRP Rx beams to possibly change/select inter/intra-TRP Rx beam(s)
      U-3: is used to enable TRP measurement on the same TRP Rx beam to change UE Tx beam in the case UE uses beamforming
[ . . . ]
Agreements:
  NR supports mechanism(s) in the case of link failure and/or blockage for NR
    Whether to use new procedure is FFS
  Study at least the following aspects:
    Whether or not an DL or UL signal transmission for this mechanism is needed
      E.g., RACH preamble sequence, DL/UL reference signal, control channel, etc.
    If needed, resource allocation for this mechanisms
      E.g., RACH resource corresponding mechanism, etc.

There are some agreements on beam management in the RAN1 #87 meeting, as stated in the Final Report of 3GPP TSG RAN WG1 #87 v1.0.0 (Reno, USA, 14-18 Nov. 2016) as follows:
Agreements:
  NR supports with and without a downlink indication to derive QCL assumption for assisting UE-side beamforming for downlink control channel reception
    FFS: details
      E.g., QCL assumption details
      E.g., indication signaling (e.g. DCI, MAC CE, RRC, etc.)
      E.g., beam-related indication for DL control and data channels There are some agreements on beam management in the RAN1 #AH1_NR meeting, as stated in the Final Report of 3GPP TSG RAN WG1 #AH1_NR v1.0.0 (Spokane, USA, 16-20 Jan. 2017) as follows:
Agreements:
  NR supports that UE can trigger mechanism to recover from beam failure
  Network explicitly configures to UE with resources for UL transmission of signals for recovery purpose
    Support configurations of resources where the base station is listening from all or partial directions, e.g., random access region
  Support transmission of DL signal for allowing the UE to monitor the beams for identifying new potential beams

[ . . . ]

Agreements:
UE measurement based on RS for beam management (at least CSI-RS) composed of K (=total number of configured beams) beams and reporting measurement results of N selected beams:
N is not necessarily fixed number
Note: The above procedure based on RS for mobility purpose is not precluded.
Reporting information at least include
Measurement quantities for N beam (s)
FFS: Detailed reporting contents, e.g., CSI, RSRP or both
Information indicating N DL Tx beam(s), if N<K
FFS: the details on this information, e.g., CSI-RS resource IDs, antenna port index, a combination of antenna port index and a time index, sequence index, etc.

[ . . . ]

Working Assumption:
NR supports at least one NW-controlled mechanism for beam management for UL transmission(s)

[ . . . ]

Working Assumptions:
Support at least one of these two alternatives of beam reporting:
Alt 1: UE reports information about TRP Tx Beam(s) that can be received using selected UE Rx beam set(s).
where a Rx beam set refers to a set of UE Rx beams that are used for receiving a DL signal
Note: It is UE implementation issues on how to construct the Rx beam set.
One example: each of Rx beam in a UE Rx beam set corresponds to a selected Rx beam in each panel.
For UEs with more than one UE Rx beam sets, the UE can report TRP Tx Beam(s) and an identifier of the associated UE Rx beam set per reported TX beam
NOTE: Different TRP Tx beams reported for the same Rx beam set can be received simultaneously at the UE.
NOTE: Different TRP TX beams reported for different UE Rx beam set may not be possible to be received simultaneously at the UE
Alt 2:UE reports information about TRP Tx Beam(s) per UE antenna group basis
where UE antenna group refers to receive UE antenna panel or subarray
For UEs with more than one UE antenna group, the UE can report TRP Tx Beam(s) and an identifier of the associated UE antenna group per reported TX beam
NOTE: Different TX beams reported for different antenna groups can be received simultaneously at the UE.
NOTE: Different TX beams reported for the same UE antenna group may not be possible to be received simultaneously at the UE

[ . . . ]

Agreements:
For reception of DL control channel, support indication of spatial QCL assumption between an DL RS antenna port(s), and DL RS antenna port(s) for demodulation of DL control channel
For reception of DL data channel, support indication of spatial QCL assumption between DL RS antenna port(s) and DMRS antenna port(s) of DL data channel
Different set of DMRS antenna port(s) for the DL data channel can be indicated as QCL with different set of RS antenna port(s)
Option 1: Information indicating the RS antenna port(s) is indicated via DCI
FFS: whether the information indicating the RS antenna port(s) will be assumed only for the scheduled "PDSCH" or until the next indication
Option 2: Information indicating the RS antenna port(s) is indicated via MAC-CE, and will be assumed until the next indication
Option 3: Information indicating the RS antenna port(s) is indicated via a combination of MAC CE and DCI
At least one option is supported
Note: Indication may not be needed for some cases:
There are some agreements on beam management in the RAN1 #88 meeting, as stated in the Final Report of 3GPP TSG RAN WG1 #88 v1.0.0 (Athens, Greece, 13-17 Feb. 2017) as follows:

Agreements:
A UE can be configured with the following high layer parameters for beam management:
N≥1 reporting settings, M≥1 resource settings
The links between reporting settings and resource settings are configured in the agreed CSI measurement setting
CSI-RS based P-1 & P-2 are supported with resource and reporting settings
P-3 can be supported with or without reporting setting
A reporting setting at least including
Information indicating selected beam(s)
L1 measurement reporting
FFS details (e.g., based on RSRP or CSI, etc.)
Time-domain behavior: e.g. aperiodic, periodic, semi-persistent
Frequency-granularity if multiple frequency granularities are supported
A resource setting at least including
Time-domain behavior: e.g. aperiodic, periodic, semi-persistent
RS type: NZP CSI-RS at least
At least one CSI-RS resource set, with each CSI-RS resource set having K≥1 CSI-RS resources
Some parameters of K CSI-RS resources can be the same, e.g. port number, time-domain behavior, density and periodicity if any

[ . . . ]

Agreements:
For reception of unicast DL data channel, support indication of spatial QCL assumption between DL RS antenna port(s) and DMRS antenna port(s) of DL data channel: Information indicating the RS antenna port(s) is indicated via DCI (downlink grants)
The information indicates the RS antenna port(s) which is QCL-ed with DMRS antenna port(s)
FFS: Indication details
E.g. explicit indication of RS port/resource ID, or implicitly derived
Note: related signalling is UE-specific
Candidate signalling methods for beam indication for a NR-PDCCH (i.e. configuration method to monitor NR-PDCCH)

MAC CE signalling
RRC signalling
DCI signalling
Spec-transparent and/or implicit method
Combination of the above
[ . . . ]
Agreement: For the signal(s) utilized for beam management (BM) for P1/P2/P3, study further whether it is UE-specific vs. non-UE-specific
[ . . . ]
Agreements:
  Beam failure event occurs when the quality of beam pair link(s) of an associated control channel falls low enough (e.g. comparison with a threshold, time-out of an associated timer). Mechanism to recover from beam failure is triggered when beam failure occurs
  Note: here the beam pair link is used for convenience, and may or may not be used in specification
  The following signals can be configured for detecting beam failure by UE and for identifying new potential beams by UE
  FFS the signals, e.g., RS for beam management, RS for fine timing/frequency tracking, SS blocks, DM-RS of PDCCH (including group common PDCCH and/or UE specific PDCCH), DMRS for PDSCH
  If beam failure event occurs and there are no new potential beams to the serving cell, FFS whether or not the UE provides an indication to L3.
  NR supports configuring resources for sending request for recovery purposes in symbols containing RACH and/or FFS scheduling request or in other indicated symbols
[ . . . ]
Agreements:
  The following mechanisms should be supported in NR:
    The UL transmission to report beam failure can be located in the same time instance as PRACH:
      Resources orthogonal to PRACH resources
    The UL transmission to report beam failure can be located at a time instance (configurable for a UE) different from PRACH
      Consider the impact of RACH periodicity in configuring the UL signal to report beam failure located in slots outside PRACH
    Additional mechanisms using other channels/signals are not precluded (e.g., SR, UL grant free PUSCH, UL control)
There are some agreements on beam management in the RAN1 #88bis meeting, as stated in the Final Report of 3GPP TSG RAN WG1 #88bis v1.0.0 (Spokane, USA, 3-7 Apr. 2017) as follows:
Agreements:
  UE Beam failure recovery mechanism includes the following aspects
    Beam failure detection
    New candidate beam identification
    Beam failure recovery request transmission
    UE monitors gNB response for beam failure recovery request
  Beam failure detection
    UE monitors beam failure detection RS to assess if a beam failure trigger condition has been met
    Beam failure detection RS at least includes periodic CSI-RS for beam management
      SS-block within the serving cell can be considered, if SS-block is also used in beam management as well
  New candidate beam identification
    UE monitors beam identification RS to find a new candidate beam
    Beam identification RS includes
      Periodic CSI-RS for beam management, if it is configured by NW
      Periodic CSI-RS and SS-blocks within the serving cell, if SS-block is also used in beam management as well
  Beam failure recovery request transmission
    Information carried by beam failure recovery request includes at least one followings
      Explicit/implicit information about identifying UE and new gNB TX beam information
      Explicit/implicit information about identifying UE and whether or not new candidate beam exists
    Down-selection between the following options for beam failure recovery request transmission
      PRACH
      PUCCH
      PRACH-like (e.g., different parameter for preamble sequence from PRACH)
    Beam failure recovery request resource/signal may be additionally used for scheduling request
  UE monitors a control channel search space to receive gNB response for beam failure recovery request
    FFS: the control channel search space can be same or different from the current control channel search space associated with serving BPLs
There are some agreements on beam management in the RAN1 #89 meeting, as stated in the Final Report of 3GPP TSG RAN WG1 #89 v1.0.0 (Hangzhou, China, 15-19 May 2017) as follows:
Agreements:
  Support spatial QCL assumption between antenna port(s) within a CSI-RS resource(s) and antenna port of an SS Block (or SS block time index) of a cell
    The other QCL parameters not precluded
    FFS: indication either explicit or implicit or configurable or a default
    Note: default assumption may be no QCL
  Configuration of QCL for UE specific NR-PDCCH is by RRC and MAC-CE signalling
    Note that MAC-CE is not always needed
    FFS: necessity of DCI signalling
    Note: For example, DL RS QCLed with DMRS of PDCCH for delay spread, Doppler spread, Doppler shift, and average delay parameters, spatial parameters
Agreement: Cell-specifically configured CSI-RS is not supported for beam management
[ . . . ]
Agreements:
  NR supports CSI-RS configuration to support Tx and/or Rx beam sweeping for beam management conveying at least the following information
    Information related to CSI-RS resource configuration
      E.g., CSI-RS RE pattern, number of CSI-RS antenna ports, CSI-RS periodicity (if applicable) etc.
    Information related to number of CSI-RS resources
    Information related to number of time-domain repetitions (if any) associated with each CSI-RS resource
      FFS: details of time-domain repetitions, e.g., signaling for time-domain repetitions may not be explicit FFS signaling details, e.g., explicit indication vs implicit indication
Note this does not imply particular option (IFDMA or subcarrier scaling or DFT based) for sub time unit partition
[ . . . ]
Agreements:
Support the following channel(s) for beam failure recovery request transmission:
Non-contention based channel based on PRACH, which uses a resource orthogonal to resources of other PRACH transmissions, at least for the FDM case
Note: this does not prevent PRACH design optimization attempt for beam failure recovery request transmission from other agenda item
Support using PUCCH for beam failure recovery request transmission
FFS whether PUCCH is with beam sweeping or not
Note: this may or may not impact PUCCH design
FFS Contention-based PRACH resources as supplement to contention-free beam failure recovery resources
From traditional RACH resource pool
4-step RACH procedure is used
Note: contention-based PRACH resources is used e.g., if a new candidate beam does not have resources for contention-free PRACH-like transmission
[ . . . ]
Agreements:
To receive gNB response for beam failure recovery request, a UE monitors NR PDCCH with the assumption that the corresponding PDCCH DM-RS is spatial QCL'ed with RS of the UE-identified candidate beam(s)
Detection of a gNB's response for beam failure recovery request during a time window is supported
If there is no response detected within the window, the UE may perform re-tx of the request
If not detected after a certain number of transmission(s), UE notifies higher layer entities
There are some agreements on beam management in the RAN1 #AH_NR2 meeting, as stated in the Final Report of 3GPP TSG RAN WG1 #AH_NR2 v1.0.0 (Qingdao, China, 27-30 Jun. 2017) as follows:
[ . . . ]
Agreements:
RAN1 agrees that the certain number of beam failure recovery request transmissions is NW configurable by using some parameters
Parameters used by the NW could be:
Number of transmissions
Solely based on timer
Combination of above
FFS: whether beam failure recovery procedure is influenced by the RLF event
There are some agreements on beam management in the RAN1 #90 meeting, as stated in the Final Report of 3GPP TSG RAN WG1 #90 v1.0.0 (Prague, Czech Rep, 21-25 Aug. 2017) as follows:
Agreements:
Support L1-RSRP reporting of measurements on SS block for beam management procedures
The following configurations for L1-RSRP reporting for beam management are supported
SS block only (with mandatory support by UE)
CSI-RS only (with mandatory support by UE)
SS block+CSI-RS independent L1 RSRP reporting
Joint L1-RSRP using QCL-ed SS-block+CSI-RS is optionally supported by UE (with optionally support by UE)
[ . . . ]
Agreements:
At least for non-grouping based beam reporting, taking the following parameter values for further consideration
For maximal TX beam numbers for a UE to measure for a given reporting instance: candidate value is, e.g., around K=[64]
For maximal TX beam numbers reported by a UE per reporting instance are, e.g., N=[1, 2, 4, 8]
For L1-RSRP levels, candidate value is, e.g., around [100]
Considering maximal L1-RSRP range, e.g., from X dBm to Y dBm
Considering step-size of L1-RSRP, e.g., Z dB
Companies are encouraged to evaluate/analyze appropriate values considering
P1, P2, and P3 procedures
The values could be different for aperiodic reporting, and semi-persistent/periodic reporting if supported
The values could be different for PUCCH and PUSCH based reporting, if supported
CSI-RS and/or SS-block related measurement/reporting
[ . . . ]
Agreements:
Beam failure is declared only when all serving control channels fail.
When a subset of serving control channels fail, this event should also be handled
[ . . . ]
Agreements:
In addition to periodic CSI-RS, SS-block within the serving cell can be used for new candidate beam identification
The following options can be configured for new candidate beam identification
CSI-RS only
Note: in this case, SSB will not be configured for new candidate beam identification
SS block only
Note: in this case, CSI-RS will not be configured for new candidate beam identification
FFS: CSI-RS+SS block
There are some agreements on beam management in the RAN1 #AH_NR3 meeting, as stated in the Final Report of 3GPP TSG RAN WG1 #AH_NR3 v1.0.0 (Nagoya, Japan, 18-21 Sep. 2017) as follows:
Agreement:
A UE is RRC configured with a list of up to M candidate Transmission Configuration Indication (TCI) states at least for the purposes of QCL indication
Whether M equal to or larger than $2^N$ is for further study, where N is the size of the DCI field for PDSCH
Each TCI state can be configured with one RS Set
Each ID (FFS: details of ID) of DL RS at least for the purpose of spatial QCL in an RS Set can refer to one of the following DL RS types:
SSB
Periodic CSI-RS
Aperiodic CSI-RS
Semi-persistent CSI-RS

[ . . . ]

Agreement:
  For QCL indication for PDSCH:
    When TCI states are used for QCL indication, the UE receives an N-bit TCI field in DCI
      The UE assumes that the PDSCH DMRS is QCL with the DL RS(s) in the RS Set corresponding to the signaled TCI state

[ . . . ]

Agreement:
  Support configuration of SSB for a UE to measure and report one or more L1-RSRP(s)
    FFS: whether the set of SSBs is all of the SSB beams or a subset of them
    Alt1: Support configuration of SSB resources within a resource setting for beam management.
      L1-RSRP measurement on these resources is reported
    Alt2: Support configuration of the RS type (e.g. SSB, CSI-RS) in a reporting setting for beam management.
      L1-RSRP measurement on these resources is reported
    Down-select between the two options

[ . . . ]

Agreement:
WA on trigger condition 1 for beam recovery request transmission is confirmed with following revision
  37 Support at least the following triggering condition(s) for beam failure recovery request transmission:
Condition 1: when beam failure is detected and candidate beam is identified Agreement:
The following working assumption is confirmed
  For beam failure recovery request transmission on PRACH, support using the resource that is CDM with other PRACH resources
    Note that CDM means the same sequence design with PRACH preambles.
    Note that the preambles for PRACH for beam failure recover request transmission are chosen from those for contention-free PRACH operation in Rel-15
    Note: this feature is not intended to have any impact on design related to other PRACH resources
    Further consider whether TDM with other PRACH is needed
  Note: Companies may further study the necessity and feasibility of additional cyclic shifts on the preamble sequences for transmission of beam failure recovery requests

[ . . . ]

Agreement:
  For new candidate beam identification purpose
    In CSI-RS only case, a direct association is configured between only CSI-RS resources and dedicated PRACH resources
    In SS block only case, a direct association is configured between only SS block resources and dedicated PRACH resources
    In CSI-RS+SS block case (if supported), an association is configured between resources of CSI-RS/SSB and dedicated PRACH resources
      CSI-RS and SSB can be associated with the same dedicated resource through QCL association There are some agreements on beam management in the RAN1 #90bis meeting, as stated in the Final Report of 3GPP TSG RAN WG1 #90bis v1.0.0 (Prague, Czech Rep, 9-13 Oct. 2017) as follows:

Agreement:
Support at least the explicit approach for the update of spatial QCL reference in a TCI state.
  FFS: Additional support for implicit update.
  Note: In the explicit approach, the TCI state is updated using either RRC or RRC+MAC-CE based approach
  Note: In the implicit approach, when a set of aperiodic CSI-RS resources are triggered, the triggering DCI includes a TCI state index which provides spatial QCL reference for the triggered set of CSI-RS resources. Following the measurement, the spatial QCL reference in the RS set corresponding to the indicated TCI state is updated based on the preferred CSI-RS determined by the UE. Other operations of implicit approaches are not precluded.

[ . . . ]

{
• Proposal: Beam measurement and reporting
  - Support Alt#1 for SSB: configuration of SSB resources within a resource setting for beam management. L1-RSRP measurement on those configured resources is reported.
  - For non-grouping based beam reporting, support the following reports parameters:
    • Maximal number of configured Tx beams for beam measurement: K equals 64
    • Maximal number of configured Tx beams to be reported in one instance: N_max = 2, 4 where a subset of N (N<=N_max where N = 1, 2, 4) beams can be selected by the gNB and indicated to the UE (FFS signaling mechanism)
    • Reporting differential L1-RSRP when multiple beams are reported in one reporting instance. Reference is the largest L1-RSRP in that reporting instance. FFS other reference for differential reporting.
    • Bit-width: 7bit for L1-RSRP ranging from −140dBm to −44dBm with 1dB stepping size (analogous with LTE) and 4bit for differential L1-RSRP
[...]
• Proposal: Update the association of TCI state and DL RS
  - Initialization/Update of the ID of a DL RS(s) in the RS Set used at least for spatial QCL purposes is done at least via explicit signalling. Support the following methods for the explicit signalling :
    • RRC
    • RRC + MAC-CE
  - Implicit Update via "implicit association of the DL RS ID(s) to a TCI state based on measurements by the UE." is FFS -continued

- FFS from RAN1 NR AH3:
  - Mechanisms to initialize/update the ID of a DL RS(s) in the RS Set used at least for spatial QCL purposes
    - At least the following two mechanisms are FFS: (1) explicit signaling to the UE of the DL RS(s) ID and corresponding TCI state (2) implicit association of the DL RS ID(s) to a TCI state based on measurements by the UE.
    - The mechanisms used for different RS types are FFS
- Proposal: Presence of TCI in DCI
  For the case when at least spatial QCL is configured/indicated, support higher-layer UE-specific configuration of whether or not TCI field is present in DL-related DCI
  - Not present: No dynamic indication of QCL parameters for PDSCH is provided in DL-related DCI
    - For PDSCH, UE applies higher-layer signalling of QCL parameters/indication for determining QCL parameters (details: FFS) except for the case of beam management without beam-related indication (ref:Annex) where no spatial QCL parameters are higher layer configured
  - Present: Details on next proposal.
  - Proposed candidate solutions should consider
    - Below and above 6GHz DL beam related operation with and without beam indication
    - Downlink beam management with and without beam indication (ref Annex)
- Note: this proposal does not apply to the case of beam management without beam-related indication (ref:Annex)
- Proposal: Timing issue of beam indication for PDSCH
  For the case when at least spatial QCL is configured/indicated, NR supports the beam indication for PDSCH as follows, if TCI field is present:
  - The TCI field is always present in the associated DCI for PDSCH scheduling irrespective of same-slot scheduling or cross-slot scheduling.
  - If the scheduling offset < threshold K: PDSCH uses a pre-configured/pre-defined/rule-based spatial assumption (details: FFS)
    - Threshold K can be based on UE capability only if multiple candidate values of K are supported.
  - If the scheduling offset >= threshold K: PDSCH uses the beam (spatial QCL parameter) indicated by the N-bit TCI field in the assignment DCI.
- Note: this proposal does not apply to the case of beam management without beam-related indication (ref: Annex)
}

[ . . . ]
Agreement:
For L1-RSRP and/or beam resource indicators (e.g. CRI or SSB index) reporting for beam management, support the following UL channels:
Short/long PUCCH
PUSCH
Support the following reporting types for beam mgmt. on the above channels
For Periodic, support long PUCCH and short PUCCH
Semi-persistent—support all channels
Aperiodic—support PUSCH and short PUCCH
[ . . . ]
Agreement:
gNB response is transmitted via a PDCCH addressed to C-RNTI
Dedicated CORESET(s) is applied for monitoring gNB response for BFRQ. The CORESET is down-selected from the following two alternatives:
Alt 1: the same CORESET(s) as before beam failure
Alt 2: dedicatedly configured CORESET for beam failure recovery.
[ . . . ]
Agreement:
Specification supports the CSI-RS+SS block case for the purpose of new candidate beam identification
The above case is configured by gNB
Note: a dedicated PRACH resource is configured to either an SSB or a CSI-RS resource
Following two scenarios are supported when a UE is configured with CSI-RS+SSB Scenario 1: PRACHs are associated to SSBs only
In this scenario, CSI-RS resources for new beam identification can be found from the QCL association to SSB(s).
Scenario 2: Each of the multiple PRACHs is associated to either an SSB or a CSI-RS resource
[ . . . ]
Working Assumption:
Beam failure detection is determined based on the following quality measure:
Hypothetical PDCCH BLER
[ . . . ]
Proposal:
A beam recovery request can be transmitted if the number of consecutive detected beam failure instance exceeds a configured maximum number
(Working assumption) If hypothetical PDCCH BLER is above a threshold, it is counted as beam failure instance
Note: Beam failure is determined when all serving beams fail
The candidate beam can be identified when metric X of candidate beam is higher than a threshold
1 or 2 threshold values are introduced
If 2 thresholds are introduced, one is for SSB and the other is for CSI-RS
One of the following alternatives will be down-selected in RAN1#91
Alt-1: Fixed value
Alt-2: Configurable value by RRC signaling RAN2 should specify the RRC signaling to configuration of the threshold
Note: for beam failure detection, the UE should aware the transmission power offset between CSI-RS and DMRS of PDCCH Agreement:
For gNB to uniquely identify UE identity from a beam failure recovery request transmission
A PRACH sequence is configured to UE Working Assumption:
At least the following parameters should be configured for dedicated PRACH resources for beam failure recovery
Per UE parameters
Preamble sequence related parameters
E.g., root sequence, cyclic shift, and preamble index
Maximum number of transmissions
Maximum number of power rampings
Target received power
Retransmission Tx power ramping step size
Beam failure recovery timer
Per dedicated PRACH resource parameters
Frequency location information
Time location, if it is only a subset of all RACH symbols (e.g., PRACH mask)
Associated SSB or CSI-RS information
Note: as a starting point, use initial access preamble transmission mechanism and parameters. If any issue is identified, new mechanism can be introduced.
No further RRC signalling for above UE parameters is required if reusing the same parameter as initial access There are some agreements on beam management in the RAN1 #91 meeting, as stated in the Final Report of 3GPP TSG RAN WG1 #91 v1.0.0 (Reno, USA, 27 Nov.-1 Dec. 2017) as follows:

Agreement:
Mechanism to indication of source QCL for a resource:
P-CSI-RS—through RRC configuration
FFS: If the spatial QCL can be configured through a reference to a configured TCI state
SP-CSI-RS—configuring the resource(s) through RRC, activation/deactivation through MAC-CE;
The QCL for SP-CSI-RS is indicated in the same MAC-CE message that activates the SP-CSI-RS.
The QCL is provided through an association with one of the M candidate TCI states
AP-CSI-RS—
Through DCI (AP-CSI-report-triggering state indication)
For each AP-CSI-RS resource associated with each triggering state, QCL configuration is provided through an association with one of the M candidate TCI states by RRC
FFS: Value of M
FFS: TCI association on NZP-CSI-RS/ZP-CSI-RS based IMR Agreement:
PUCCH beam indication is introduced by RRC signalling
Introduce one RRC parameter: PUCCH-Spatial-relation-info
Information associating an SSB ID or, a CRI, or a SRI
This is per PUCCH resource configuration Agreement:
For the number of TCI states and mapping to DCI bits, N is 3 bits.
Note: The number of TCI states supported by a UE depends on its capability Agreement:
The state Is-TCI-Present is configured on a per-CORESET basis
For beam management with beam indication, on all CORESETs configured with Is-TCI-Present=false, the TCI state used for PDCCH is reused for PDSCH reception Agreement:
A candidate set of DL RSs are configured using RRC mechanism
Each state of M TCI states is RRC configured with a downlink RS set used as a QCL reference, and MAC-CE is used to select up to 2^N TCI states out of M for PDSCH QCL indication
The same set of M TCI states are reused for CORESET
K TCI states are configured per CORESET
When K>1, MAC CE can indicate which one TCI state to use for control channel QCL indication
When K=1, no additional MAC CE signaling is necessary

[ . . . ]

Agreement:
When the scheduling offset is <=k, the PDSCH uses QCL assumption that is based on a default TCI state (e.g. the first state of the 2^N states used for PDSCH QCL indication)

Agreement
Differential RSRP is computed with reference to the strongest reported RSRP
Step size: 2 dB Agreement
Computation of L1-RSRP as a linear average of each port's RSRP for the 2-port CSI-RS for beam mgmt.

Agreement
Between initial RRC configuration and MAC CE activation of TCI states, the UE may assume that both PDCCH and PDSCH DMRS are spatially QCL-ed with the SSB determined during initial access Agreement
For the beam management use case, support configuration of up to S=16 CSI-RS resources sets per resource setting, and Ks=1~64 CSI-RS resources per resource set
The total number of CSI-RS resources in all sets cannot be more than 128
Note: One set is selected out of S sets in the CSI trigger states

[ . . . ]

Agreement:
When the scheduling offset is <=k, and the PDSCH uses QCL assumption that is based on a default TCI state
The default TCI state corresponds to the TCI state used for control channel QCL indication for the lowest CORESET ID in that slot Agreement:
Modify the RRC parameter PUCCH-Spatial-relation-info as list.
Each entry can be SSB ID or, a CRI, or a SRI
One or multiple SpatialRelationInfo IE(s) is included in the list.
Introduce MAC-CE signalling to provide spatial relation information for a PUCCH resource to one of the entries in PUCCH-Spatial-relation-info
If PUCCH-Spatial-relation-info includes one SpatialRelationInfo IE, UE applies the configured SpatialRelationInfo and no MAC-CE is used.

MAC-CE Impact:

| TS38.214 | Indication of spatial relation for PUCCH | Provides the spatial relation for a PUCCH resource | PUCCH resource ID | Bitmap of size [8] (Bitmap activates one of the [8] entries within the RRC parameter PUCCH-Spatial-relation-info) | 5 |
|---|---|---|---|---|

RRC modification:

| PUCCH-SpatialRelation Info | New | PUCCH-Spatial Relation Info | List of configurations of the spatial relation between reference RS and PUCCH. Reference RS can be SSB/CSI-RS/SRS. SSB Index, NZP-CSI-RS-ResourceConfigId, or SRS-ResourceConfigId | UE-Specific | 38.331 |
|---|---|---|---|---|---|

[ . . . ]
Agreement

TABLE 1

Beam-failure-recovery-request-RACH-Resource configuration

| RRC parameter | Value range | Note/description |
|---|---|---|
| RootSequenceIndex-BFR | {0, 1, . . . , 137} | Short sequence only |
| ZeroCorrelationZoneConfig-BFR | {0, 1, . . . , 15} | Determine cyclic shift. Value range same as IA session |
| PreambleInitialReceivedTargetPower-BFR | FFS | Value range same as IA session |
| ra-PreambleIndexConfig-BFR | FFS | Value range same as IA session |
| PreambleTransMax-BFR | FFS | Value range same as IA session |
| powerRampingStep-BFR | FFS | |
| CandidateBeamThreshold | | One threshold for CSIRS |
| Candidate-Beam-RS-List | | A list of RS indices. The entry of each list can be a SSB index or a CSI-RS resource index |
| PRACH-resource-dedicated-BFR | | The following fields are defined for each candidate beam RS |
| Candidate-Beam-RS | {SSB index or CSI-RS ID} | RS index that is associated with the following PRACH resource Note: if the candidate-beam-RS-List includes both CSIRS resource indexes and SSB indexes, AND only SSB indexes are associated with PRACH resources, NR standard should specify a rule that the UE should Monitor both CSI-RS and SSB for New Beam Identification. |
| ra-PreambleIndex-BFR | FFS | Preamble index used to select one from a sequence pool |
| prach-FreqOffset-BFR | FFS | FDM'ed to other PRACH resources. Value range same as IA session |
| masks for RACH resources and/or SSBs | FFS | Time domain mask. Value range same as IA session |

TABLE 2

Other RRC parameters related to beam failure recovery

| RRC parameter (UE-specific parameters) | Value range | Note/description |
|---|---|---|
| ResponseWindowSize-BFR | FFS | Time duration for monitoring gNB response in Beam-Failure-Recovery-Response-CORESET after BFRQ. Similar to ra-ResponseWindowSize |
| Beam-failure-recovery-Timer | FFS | Details on UE behaviour related to the timer is FFS |
| NrOfBeamFailureInstance | FFS | Consecutive number of beam failure instances for declaring beam failure |
| Beam-Failure-Recovery-Response-CORESET | FFS | |

[ . . . ]
Agreement:
For a UE, only periodic CSI-RS or SSB which is spatially QCL'ed with PDCCH DMRS is used for beam failure detection
  Support explicit configuration for the periodic CSI-RS for beam failure detection
    If this configuration is not made, the default mode is the following:
      UE expects at least one of periodic CSI-RS or SSB is spatially QCL'ed to PDCCH DMRS
Agreement:
The measurement metric for candidate beam selection is L1-RSRP
  An RRC parameter is introduced to configure the threshold value for L1-RSRP based on CSI-RS
    Another threshold can be implicitly derived for L1-RSRP based on SSB
[ . . . ]
Agreement
The BLER used for beam failure recovery reuses RLM default BLER threshold for RLM out-of-sync declaration
Agreement
The starting point of the observation window of gNB response to beam failure recovery request transmission is 4 slots
[ . . . ]
For email approval by December 6—MediaTek (Weidong) Update After Email Approval
Agreements:
If the Candidate-Beam-RS-List includes both CSI-RS resource indexes and SSB indexes, AND only SSB indexes are associated with PRACH resources,
  UE identifies PRACH resources for CSI-RS resource(s) in the Candidate-Beam-RS-List via spatial QCL indication between SSBs and CSI-RS resources, if UE-identified new beam(s) is associated with CSI-RS resource(s)
    UE sends BFRQ through a PRACH resource associated with the SSB, which is spatially QCLed with the CSI-RS resource.
  Note: in case the Candidate-Beam-RS-List includes both CSI-RS resource indexes and SSB indexes, AND only SSB indexes are associated with PRACH resources, a UE is not expected to be configured by Candidate-Beam-RS-List a CSI-RS resource which does not have a spatial QCL association with any of the SSB in the same Candidate-Beam-RS-List.
Agreements: If there are multiple beams above the threshold for new beam identification, it is up to UE implementation to select a PRACH resource associated to the SSB/CSI-RS resource satisfying the threshold condition.
Agreements: Upon receiving gNB response for beam failure recovery request transmission
  UE shall monitor CORESET-BFR for dedicated PDCCH reception until one of the following conditions is met:
    Reconfigured by gNB to another CORESET for receiving dedicated PDCCH and activated by MAC-CE a TCI state if the configured CORESET has K>1 configured TCI states
      FFS: if a default TCI state can be assumed for PDCCH after reconfiguration without MAC-CE activation
    Re-indicated by gNB to another TCI state(s) by MAC-CE of CORESET(s) before beam failure
  Until the reconfiguration/activation/re-indication of TCI state(s) for PDCCH, UE shall assume DMRS of PDSCH is spatial QCL'ed with DL RS of the UE-identified candidate beam in the beam failure recovery request
  After the reconfiguration/activation/re-indication of TCI state(s) for PDCCH, UE is not expected to receive a DCI in CORESET-BFR.
  Note: this applies to same carrier case.

3GPP R1-1710539 discusses multi-carrier QCL as follows:

On Multi-Carrier QCL

Similar to LTE, it is expected that NR should be capable of supporting carrier aggregation feature to facilitate downlink and uplink transmission over channels with different bandwidths. The carrier aggregation framework in NR, should be flexible enough to support aggregation of the component carriers in different bands (inter-band CA) as well as component carriers in the same band (intra-band CA), where intra-band CA would be more common scenario for the carrier frequencies above 6 GHz.

In the scenarios with intra-band CA due to use of the same RF and antenna panels, it may be beneficial to consider QCL assumption between antenna ports transmitted on different CCs. The cross-carrier QCL for the antenna ports can reduce or avoid overhead associated with transmission of the beam management reference signals, synchronization reference signals, RRM measurement reference signals or other reference signals that provides the same or similar measurement results on the component carriers.

In general case NR should support independent beam management procedures on different component carriers. However, in practice for the frequency bands above 6 GHz, due to use of the same RF and antenna panels, the selected analog beamforming is typically common for all aggregated component carriers. In addition, the set of the preferred analog beams should be the same across aggregated carriers within operating band that can be used to optimize beam management procedure. More specifically, the beam management procedure in CA case can be simplified and carried out only by the gNB and UE using only one component carrier. In this approach the set of the acquired beams can then be reused for the other component carriers by establishing the corresponding cross-carrier QCL assumptions for the antenna ports wrt to spatial domain QCL parameters of the channel. In the scenario where QCL on different CC is not established, gNB should not use cross-CC QCL indication and request UE to perform independent BM procedures.

Proposal:
 To support beam management procedure in NR, consider establishing QCL between antenna ports of the reference signals transmitted on different component carriers wrt to spatial QCL parameters of the channel (e.g. mean angle-of-arrival and angle-of-arrival spread)

Similar optimizations can be introduced for the synchronization signals, where the acquired time and frequency offsets on one component carrier are valid for other component carriers. In this case the synchronization procedure can be simplified and carried out by the gNB and UE using only one component carrier. In this approach the acquired timing and frequency offsets can be reused for the other component carrier(s) by establishing the corresponding cross-carrier QCL assumptions for the antenna ports of the reference signals wrt to time and frequency domain QCL parameters of the channel.

Proposal:
 To support synchronization procedures in NR, consider establishing QCL between antenna ports of the reference signals transmitted on different component carriers wrt to time and frequency QCL parameters of the channel (e.g. average delay, delay spread Doppler shift and Doppler offset)

Similar optimizations can be introduced for the RRM measurement signals, where the RSRP measured on one component carrier may be also valid for other component carriers. In this case the RRM measurements can be improved by averaging or reusing of the RSRP measurements from different component carriers. For example, If QCL assumption is established wrt to power domain QCL parameter (i.e. average gain), RSRQ reports (as defined in LTE) for each component carrier can be obtained by re-using RSRP across the component carriers, without transmitting the RRM measurement signals.

Proposal:
 To support RRM measurements in NR, consider establishing QCL between antenna ports of the reference signals transmitted on different component carriers wrt to power QCL parameters of the channel (e.g. average gain)

3GPP R1-1800242 proposes that beam failure recovery is self-contained in a single carrier as follows:

2.2 Cross-Carrier Scheduling

The current agreements on beam failure recovery apply at least to the case of same-carrier scheduling. It needs to be discussed whether cross carrier aspects should be considered for BFR procedure, e.g.
 Whether PRACH can be sent on a different UL carrier than the one associated with the DL carrier,
 Whether CORESET-BFR can be configured in a different carrier from existing CORESET,
 Whether CORSET-BFR supports cross-carrier scheduling.

Our views are summarized below:
 For PRACH carrying beam failure recovery request, we currently do not see the need to transmit on a non-associated UL carrier.
 For CORSET-BFR, in theory it can be configured in another carrier if control resource on the current carrier is congested. However given that analog beam management is mostly for >6 GHz where channel bandwidth is abundant, the need of such configuration is not clear. Furthermore, as new alternative beam is measured on the current carrier and not valid for other carrier on which COREST-BFR is configured (unless cross-carrier spatial QCL is pre-configured), the need of this operation is further limited.
 Likewise, the need of cross-carrier scheduling for CORESET-BFR is not clear.

Proposal: Beam failure recovery is self-contained in a single carrier.

3GPP R1-1800734 proposes that beam management results in one component carrier may be reused in another component carrier, which may lead to a significant overhead reduction, as follows:

It was agreed that NR supports QCL assumptions across carriers [3]. If two component carriers have similar received power distribution in the spatial domain (e.g., two frequencies are sufficiently close), beam management results (e.g., beam measurement and reporting) in one component carrier may be reused in another component carrier, which may lead to a significant overhead reduction. Since it was already agreed that a UE may be RRC configured with a list of Transmission Configuration Indication (TCI) states for the purposes of QCL indication [5], the configured TCI state table may be further extended to include a spatial QCL relationship among different component carriers. For example, whether RSs in a RS set of a TCI state may have similar beam qualities or not. By including such QCL information, part or all information of one TCL state table maintained for one component carrier may be reused for another component carrier. This will reduce the overhead of using multiple TCI state tables for multiple component carriers, and so relief the scalability issue if a UE is configured with multiple component carriers.

Proposal 2: TCI state tables should include the information of QCL assumptions across carriers.

One or multiple of following terminologies may be used hereafter:
 BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
 TRP: A transmission and reception point provides network coverage and directly communicates with UEs. TRP could also be referred to as distributed unit (DU) or network node.
 Cell: A cell is composed of one or multiple associated TRPs, i.e. coverage of the cell is composed of coverage of all associated TRP(s). One cell is controlled by one BS. Cell could also be referred to as TRP group (TRPG).
 Beam sweeping: In order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.

Beam sweeping number: A necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.

Serving beam: A serving beam for a UE is a beam generated by a network node, e.g. TRP, which is currently used to communicate with the UE, e.g. for transmission and/or reception.

Candidate beam: A candidate beam for a UE is a candidate of a serving beam. Serving beam may or may not be candidate beam.

Qualified beam: A qualified beam is a beam with radio quality, based on measuring signal on the beam, better than a threshold.

The best serving beam: The serving beam with the best quality (e.g. the highest BRSRP value).

The worst serving beam: The serving beam with the worst quality (e.g. the worst BRSRP value).

NR-PDCCH: A channel carries downlink control signal which is used to control communication between a UE and a network side. A network transmits NR-PDCCH on configured control resource set (CORESET) to the UE.

UL-control signal: An UL-control signal may be scheduling request (SR), channel state information (CSI), HARQ-ACK/NACK for downlink transmission Slot: a scheduling unit in NR. Slot duration is 14 OFDM symbols.

Mini-slot: A scheduling unit with duration less than 14 OFDM symbols.

Slot format information (SFI): Information of slot format of symbols in a slot. A symbol in a slot may belong to following type: downlink, uplink, unknown or other. The slot format of a slot could at least convey transmission direction of symbols in the slot.

DL common signal: Data channel carrying common information that targets for multiple UEs in a cell or all UEs in a cell. Examples of DL common signal could be system information, paging, RAR.

DL URLLC: A type of DL transmission which requires very high reliability and very low latency. To fulfill the latency requirement, an example is to transmit DL URLLC in a mini-slot, e.g. the data duration could be less than 1 slot such as 1~4 OFDM symbol(s) and there may be one or multiple monitoring occasions for DL URLLC control in a slot. In this example, a UE is configured with a CORESET to monitor for DL URLLC control indicating DL URLLC transmission. The CORESET can be configured on middle symbol of a slot. The DL URLLC transmission may be transmitted on the following few symbols of the CORESET.

Figure 18:
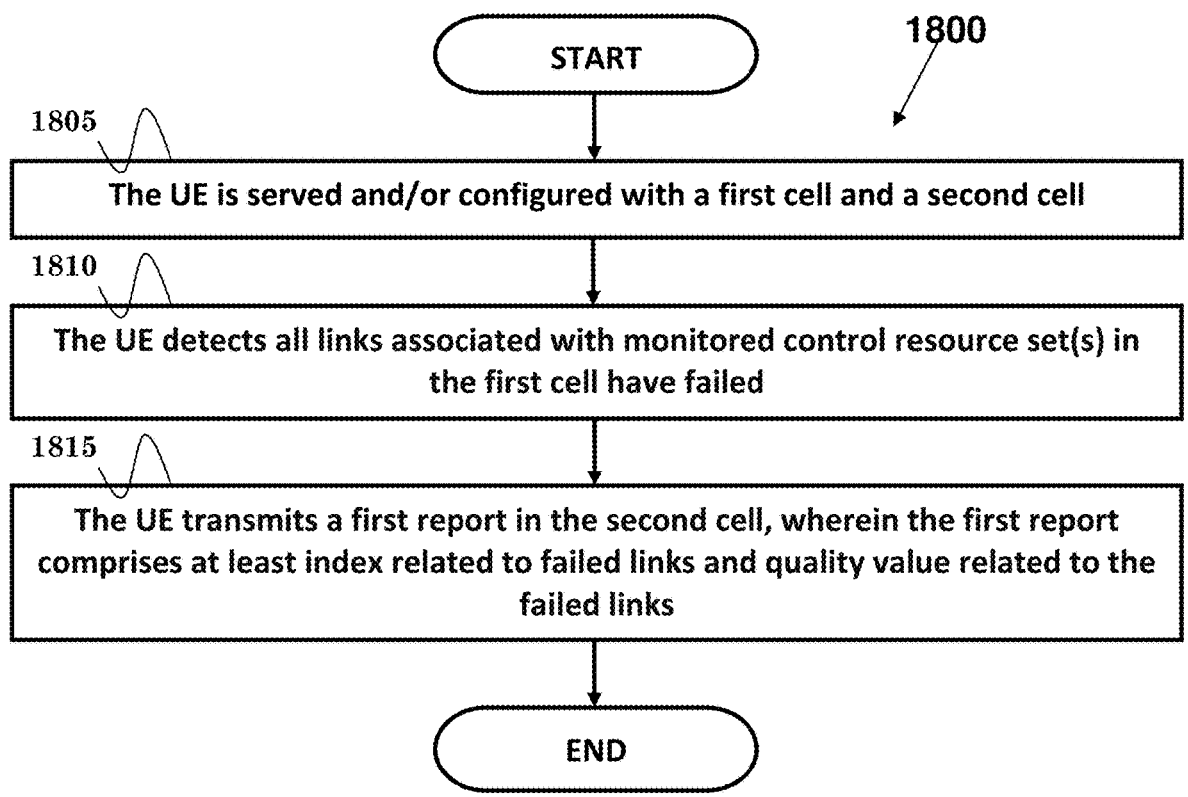
FIG. 18 is a flow chart according to one exemplary embodiment.

One or multiple of following assumptions for network side may be used hereafter:
NR using beamforming could be standalone, i.e. UE can directly camp on or connect to NR.
NR using beamforming and NR not using beamforming could coexist, e.g. in different cells.
TRP would apply beamforming to both data and control signaling transmissions and receptions, if possible and beneficial.
Number of beams generated concurrently by TRP depends on TRP capability, e.g. maximum number of beams generated concurrently by different TRPs may be different.
Beam sweeping is necessary, e.g. for the control signaling to be provided in every direction.
(For hybrid beamforming) TRP may not support all beam combinations, e.g. some beams could not be generated concurrently. FIG. 18 shows an example for combination limitation of beam generation.
Downlink timing of TRPs in the same cell are synchronized.
RRC layer of network side is in BS.
TRP should support both UEs with UE beamforming and UEs without UE beamforming, e.g. due to different UE capabilities or UE releases.

Figure 13:
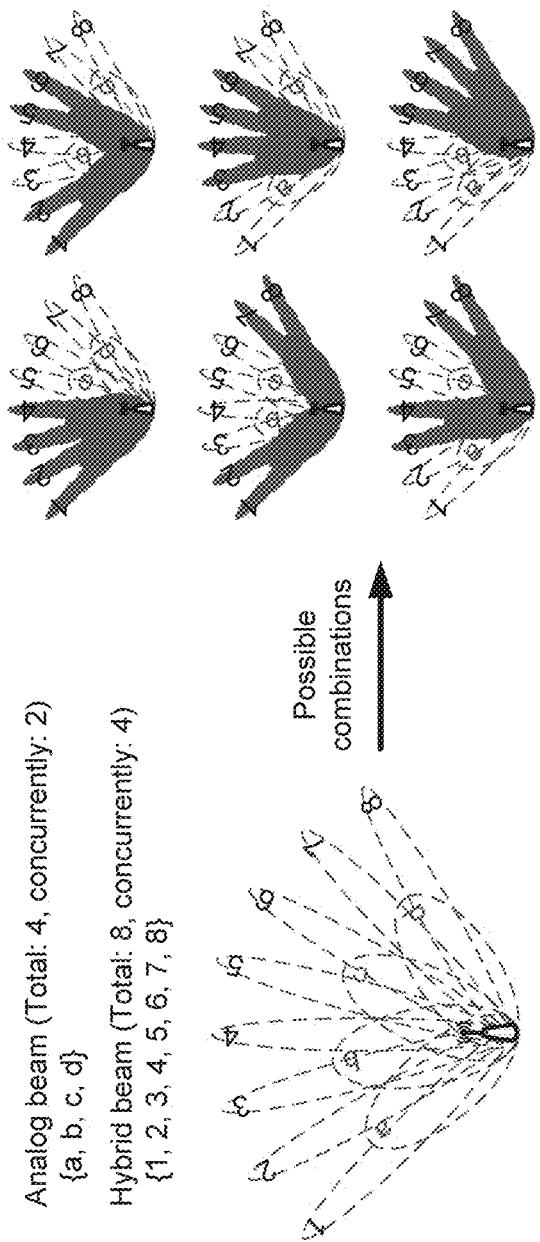
FIG. 13 shows an exemplary combination limitation of beam generation.

One or multiple of following assumptions for UE side may be used hereafter:
UE may perform beamforming for reception and/or transmission, if possible and beneficial.
Number of beams generated concurrently by UE depends on UE capability, e.g. generating more than one beam is possible.
Beam(s) generated by UE is wider than beam(s) generated by TRP, gNB, or eNB.
Beam sweeping for transmission and/or reception is generally not necessary for user data but may be necessary for other signaling, e.g. to perform measurement.
(For hybrid beamforming) UE may not support all beam combinations, e.g. some beams could not be generated concurrently. FIG. 13 shows an example of combination limitation of beam generation.
Not every UE supports UE beamforming, e.g. due to UE capability or UE beamforming is not supported in NR first (few) release(s).
One UE is possible to generate multiple UE beams concurrently and to be served by multiple serving beams from one or multiple TRPs of the same cell.
Same or different (DL or UL) data could be transmitted on the same radio resource via different beams for diversity or throughput gain.
There are at least two UE (RRC) states: connected state (or called active state) and non-connected state (or called inactive state or idle state). Inactive state may be an additional state or belong to connected state or non-connected state.

Figure 14:
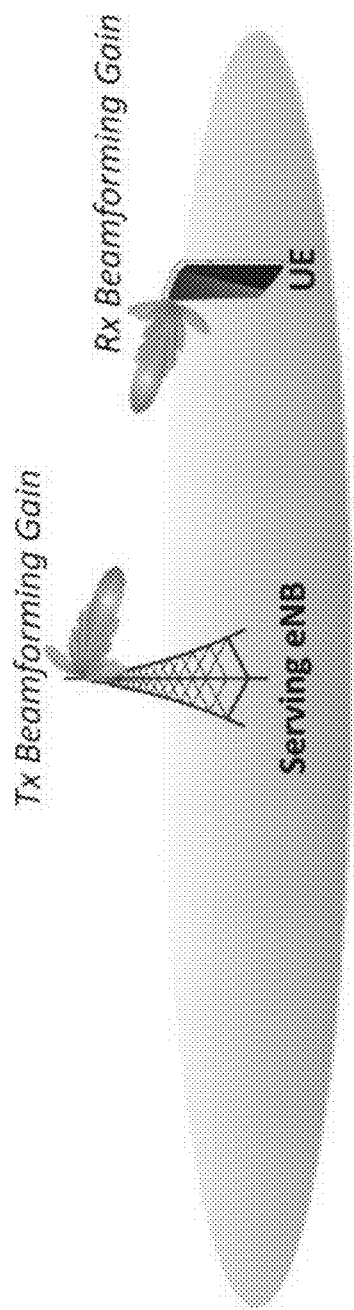
FIG. 14 is a reproduction of FIG. 3 of 3GPP R2-162251.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 14 (a reproduction of FIG. 3 of 3GPP R2-162251) illustrates gain compensation by beamforming.

Figure 15:
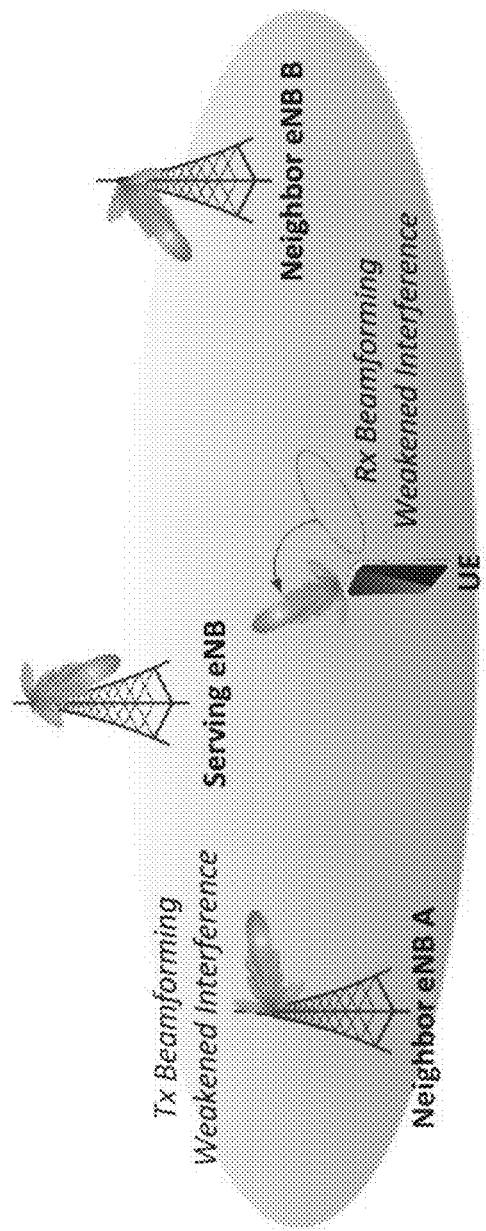
FIG. 15 is a reproduction of FIG. 4 of 3GPP R2-162251.

From the SINR perspective, sharp beamforming reduces interference power from neighbor interferers, i.e. neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. FIG. 15 (a reproduction of FIG. 4 of 3GPP R2-162251) illustrates a weakened interference by beamforming.

In 5G/NR, in order to provide a huge traffic rate for variable types of requirement and service in the future, wider and higher frequency bandwidths are used to achieve the goal. However, the higher bands in which the transmission is performed, the more severe the propagation loss would be. Hence, in NR, beamforming technology has been considered and accepted as a method to alleviate the problem and improve the coverage. In NR, there may be one or multiple of beam pair links between UE and network to connect. Due to possible blockage or interference or UE movement/rotation, beam quality of beam pair links is likely to change time-variably. Hence, currently in NR, there are some mechanisms for network to trace beam quality of beam pair links between network and UE. For example, network configures one or more than one downlink RS (Reference Signal) for UE to measure, e.g. CSI-RS (Channel State Information Reference Signal) for beam measurement or L1-RSRP (L1 Reference Signal Received Power) computation. Network can configure one or more than one resource set or setting, wherein UE knows the one or more than one resource set/setting is for beam measurement or L1-RSRP computation. Network also configures report configuration for UE to report measured beam quality or L1-RSRP value.

In order to cover a transmission range, network may configure or transmit more than one downlink RS resources toward different transmission directions via different beams, e.g. beam sweeping. These downlink RS resources may be transmitted in different symbols, wherein these symbols can be continuous. Through swept beams or downlink RSs, network can trace the quality of current (serving) beams to UE and be able to find (possible) beam(s) with higher quality. After UE performs measurement, UE is supposed to transmit or report measured beam quality or L1-RSRP based on report configuration, e.g. transmit beam report based on reporting configuration. However, such mechanism could induce considerable overhead due to transmitting downlink RS on more than one symbol for beam measurement and reporting. Not to mention that in multicell or multicarrier scenario, the signaling overhead could be even significant. For instance, for a UE configured with three serving cells, the UE may require to perform beam measurement and/or beam reporting separately on the three serving cells. The overhead, e.g. RSs for beam measurement and/or resource for beam reporting, may increase proportionally to number of serving cells for a UE.

In fact, for intraband carriers, UE is likely to receive downlink traffic from these carriers or cells using the same RF or transceiver or co-located RF or transceiver. In other words, for carriers or serving cells located in the same frequency band or carriers or serving cells whose frequency bands are close, UE can use the same or similar beam to receive downlink transmission from these carriers or cells. In detail, for intraband carriers or serving cells or carriers serving cells that are close in frequency bands, the antenna ports used to receive these carriers/serving cells can be assumed to be quasi co-located (QCL) with respect to at least spatial RX parameters. Even for serving cells whose are interband carriers, if their transmitting nodes are the same or co-located, the QCL with respect to spatial RX parameters of antenna ports among these serving cells can be assumed. According to the above description, the result of beam management in a serving cell may be applied to another one serving cell. Hence, certain level overhead reduction of signaling overhead may be achieved by reusing result of beam management or RS resource measurement in one serving cell for other serving cells.

A first general concept of this invention is that a UE may not be configured with reference signal resource for beam measurement in a serving cell. The reference signal can be used to measure L1-RSRP value. The reference signal can be CSI-RS for beam management or SS (Synchronization Signal) or PBCH (Physical Broadcast Channel) block or sounding reference signal for beam management.

A second general concept of this invention is that a UE may not be configured with beam reporting configuration in a serving cell. The beam reporting configuration is associated with the reference signal for beam measurement. The UE may report measurement result based on the beam reporting configuration after receiving and/or measuring the reference signal (resource) for beam measurement. The UE may report measurement result in unit of L1-RSRP value. The UE may not report CQI (Channel Quality Indicator) according to the report quantity indicated in beam reporting configuration.

A third general concept of this invention is that a UE is configured with a reference (serving) cell, wherein the QCL assumption of antenna ports to receive downlink transmission in some of the other serving cells can refer to the reference cell. For example, a UE can assume the antenna port for receive downlink transmission in a serving cell is QCLed with a downlink reference signal (resource), wherein the downlink reference signal (resource) is transmitted in the reference cell, e.g. QCL respect to spatial Rx parameter. A UE can refer to the QCL assumption to receive downlink transmission in other serving cell.

The UE may be configured with more than one reference cell. A reference cell and a set of serving cells may be grouped into a group, e.g. cell group, wherein the set of serving cells receive downlink transmission by referring to the QCL assumption of the reference cell. PCell may be a reference cell.

Any combination of the above concepts can be done to form a new method. The above concepts and examples can be performed and captured (but not limited to) in the following embodiments.

Exemplary Embodiment 1

In one embodiment, a UE may not be configured with a resource configuration in a first serving cell. The resource configuration could comprise or indicate at least a resource or a resource indication. The UE could receive the resource to measure and/or compute a quality.

In one embodiment, the quality may be L1-RSRP, BLER (Block Error Rate), or hypothetical BLER. A downlink reference signal could be transmitted on the resource (e.g. reference signal or physical channel). The resource or resource configuration could for L1-RSRP computation or beam measurement. The UE could be configured with one or more than one serving cells.

In one embodiment, the resource or resource configuration may comprise any of the followings: time domain behavior (e.g. periodic, semi-persistent or aperiodic) and/or time domain duration of the resource (e.g. number symbols).

Alternatively, the resource or resource configuration may comprise any of the followings: REs mapping (which may be in frequency domain, time domain, code domain), frequency domain bandwidth of the resource, number of (antenna) ports used to transmit the resource, and/or an ID for identification.

In one embodiment, the downlink reference signal could be CSI-RS and/or SSB (Synchronization Signal Block).

In one embodiment, the UE may be configured with a reporting configuration in the first serving cell. Alternatively, the UE may not be configured with a reporting configuration in the first serving cell. The reporting configuration could comprise information of a report. The report or the report configuration could be associated with reporting measured result in unit of L1-RSRP, or with beam measurement.

In one embodiment, the reporting configuration may be linked to the resource configuration for L1-RSRP computation and/or for beam measurement. In one embodiment, the reporting configuration or the report may be linked to resource indicated in the resource configuration for L1-RSRP computation or beam measurement. More specifically, the reporting configuration or the report may be linked to one kind of downlink reference signal transmitted in resource indicated in the resource configuration for L1-RSRP computation or beam measurement.

In one embodiment, the reporting configuration could comprise at least time domain behavior of the report. The report could correspond to a measured quality or measurement result. In particular, the report could correspond to a measured quality or measurement result after receiving and/or measuring the resource indicated in the resource configuration. The reporting configuration could indicate at least the quantity of the report. in one embodiment, the quantity of the report may be related to L1-RSRP, CQI, and/or BLER. The UE may not be configured with a reporting configuration indicating that the quantity of the report is L1-RSRP in the first serving cell.

In one embodiment, the reporting configuration may comprise any of the following:
  time domain behaviour of the report, e.g. periodic, semi-persistent or aperiodic;
  an ID for identification;
  association with a downlink bandwidth part or uplink bandwidth part;
  reporting granularity in the frequency domain;
  periodicity of the report, if the time domain behaviour of the report is periodic or semi-persistent; and/or
  the slot offset of the report, if the time domain behavior of the report is periodic or semi-persistent.

In one embodiment, the slot offset of the report may refer to the distance between each report in unit of slot. The slot offset can be replaced with a time unit offset.

The UE may or may not be configured with a second serving cell. In one embodiment, the UE may be configured with the resource configuration in the second serving cell, and/or with the reporting configuration in the second serving cell. The UE may assume that the QCL assumption for receiving one of any downlink transmission in the first serving cell can be referred to the second serving cell. More specifically, the UE may assume that the antenna port(s) for receiving one of any downlink transmission in the first serving cell is quasi co-located with one of any downlink reference signal transmitted in the second serving cell.

The UE may be indicated an index in the first serving cell, wherein the indication or index can be referred to by the UE to receive one of any downlink transmission in the first serving cell. The index may be an index of a downlink resource transmitted on the second serving cell. In one embodiment, a downlink reference signal could be transmitted on the downlink resource.

In one embodiment, the UE may assume that the antenna port(s) for receiving one of any downlink transmission in the first serving cell is quasi co-located with one of any downlink reference signal received in the second serving cell. The UE may use the same spatial RX parameters to receive one of any downlink transmission as that to receive the downlink resource, wherein the downlink resource is indicated or related to the index.

In one embodiment, the index could be CRI (CSI-RS Resource Indicator). Alternatively, the index could SSB index or SSBRI (SSB resource index).

The second serving cell may be configured with a higher layer parameter for QCL indication. In one embodiment, the higher layer parameter may be associated (i) with one of any downlink reference signal transmitted in a serving cell where the higher layer parameter is configured, (ii) with one of any downlink reference signal transmitted in the second serving cell, or (iii) with a QCL type. The UE may receive one of any downlink transmission based on the higher layer parameter configured in the second serving cell. In one embodiment, the first serving cell may or may not be configured with the higher layer parameter. Alternatively, the higher layer parameter may be TCI or TCI state.

In one embodiment, the QCL type may related to any of the followings:
  Doppler shift;
  Doppler spread;
  average delay;
  delay spread; and/or
  spatial Rx parameter.

The report for the first serving cell based on the report configuration is a first report. The report for the second serving cell based on the report configuration is a second report. The first report could comprise measured result of a first set of reference signals. The second report could comprise measured result of a second set of reference signals. The first set of reference signals may not be the same as the second set of reference signals. In one embodiment, the first set of reference signals may be a subset of the second set of reference signals.

In one embodiment, the content or first report may be different from the content of the second report. More specifically, the bit length of the first report may be less than or equal to that of the second report.

The UE may transmit a report for the first cell, wherein the report comprises the quality measurement result derived from part of a set of the resources in the second cell. In one embodiment, the set of resource could comprise a set of CSI-RS resources or SS or PBCH blocks. In one embodiment, the quality measurement result may mean RSRP or BLER derived by the UE.

In one embodiment, the report may comprise the quality measurement result related to the link quality in the first cell. The report may also comprise index related to the part of a set of the resources and quality value related to the part of a set of the resources.

In one embodiment, the report may be per cell. Furthermore, the report may be for beam reporting of the first cell. The report may be transmitted in the second cell or the first cell. The first cell could be a secondary cell. The second cell could be primary cell.

In one embodiment, the UE could transmit the report in physical uplink control channel. The UE could be configured with resource configuration of the set of resource in the second cell. The set of resource in the second cell could be for beam measurement. More specifically, the set of resource in the second cell could be for beam measurement of the second cell. Alternatively, the set of resource in the second cell could be for beam measurement of the first cell. The quality measurement of the part of the set of resource in the second cell could refer to beam status of the first cell.

In one embodiment, the first cell and the second cell could be secondary cells. The first cell could be a secondary cell, and the second cell could be a primary cell.

Exemplary Embodiment 2

In another embodiment, the UE may not be configured with resource configuration in a first serving cell. The resource configuration could comprise or indicate at least a resource. An uplink reference signal could be transmitted on the resource. The UE could transmit the uplink reference signal on the resource indicated in the resource configuration. The uplink reference signal could be sounding reference signal.

In one embodiment, the resource configuration could indicate the purpose of transmitting the resource or the uplink reference signal. The purpose of transmitting the resource or the uplink reference signal could be for beam management or for L1-RSRP computation. The UE could be configured with one or more than one serving cells.

In one embodiment, the resource or resource configuration may comprise any of the followings: time domain behavior (e.g. periodic, semi-persistent or aperiodic), or the time domain duration of the resource (e.g. number symbols). The resource or resource configuration may also comprise any of the followings: REs mapping (which may be in frequency domain, time domain, code domain), frequency domain bandwidth of the resource, number of (antenna) ports used to transmit the resource, or an ID for identification.

The UE may or may not be configured with a second serving cell. In one embodiment, the UE could be configured with the resource configuration in the second serving cell. The UE could assume that the antenna port(s) for transmitting one of any uplink transmission in the first serving cell is quasi co-located with one of any uplink reference signal transmitted in the second serving cell. More specifically, the UE could use the same spatial TX parameters to transmit one of any uplink transmission as that to transmit one of any uplink transmission in the first serving cell.

The UE may be indicated an index in the first serving cell, wherein the indication or index can be referred to by the UE to transmit one of any uplink transmission in the first serving cell. The index could be an index of an uplink resource transmitted on the second serving cell. The UE could use the same spatial TX parameters to transmit one of any uplink transmission as that to transmit the uplink resource, wherein the uplink resource is indicated or related to the index. The index could be SRI (SRS Resource Indicator).

The first serving cell may not configured with the higher layer parameter. Alternatively, the first serving cell may be configured with the higher layer parameter.

Exemplary Embodiment 3

For a UE served or configured with a first cell and a second cell, the UE could detect that the quality of monitored control resource set in the first cell is worse than a threshold. The quality of the monitored control resource set in the first cell is derived from a first set of resource. The UE may transmit a first report in the second cell.

In one embodiment, the first report may comprise an index related to the first set of resource and a value related to the quality of the monitored control resource set. The first set of resource may comprise a set of CSI-RS resources, or SS (Synchronization Signal) or PBCH (Physical Broadcast Channel) blocks. The quality of monitored control resource set could mean RSRP (Reference Signal Received Power) or BLER (Block Error Rate) derived by the UE.

More specifically, the quality of all monitored control resource sets in the first cell may be worse than the threshold, and the UE may transmit the first report in the second cell. The first report may comprise an index related to the all monitored control resource sets and a value related to the quality of the all monitored control resource sets.

In one embodiment, the UE may not report failed links in a cell other than the first cell in the first report. Additionally, the UE may not report the quality of monitored control resource set in a cell other than the first cell in the first report.

In one embodiment, the UE may detect that all links associated with monitored control resource set in the first cell are failed. The UE may transmit a first report in the second cell. The first report may comprise at least index related to failed links and quality value related to the failed links. In one embodiment, "link" could refer to a connection between the UE and network, e.g. a beam pair link, a beam connection. "A failed link" or "a link fails" could refer to a situation where the quality of the connection between the UE and network falls below a threshold, such as a RSRP or BLER, derived by the UE and related to the beam connection, is below a threshold. In one embodiment, the UE may keep connecting with network via at least the second cell. The first report may be per cell. The first report may comprise one or more indices related to respective failed links and one or more quality values related to respective failed link.

In one embodiment, the quality value may be set to a predetermined value in the first report. The predetermined value may be the allowed minimum quality value to report, e.g. −140 dBm. The quality value may be in unit of dBm or related to RSRP. In one embodiment, if BlER related to a link is below a threshold, the UE may set the quality value of the link as the predetermined value in the first report even though RSRP related to the link is larger than the predetermined value. The index may be a RS resource index.

In one embodiment, the UE could be configured with a first reporting configuration, and the UE could transmit the first report based on the first reporting configuration. The UE could transmit a second report if at least one link associated with monitored control resource set(s) in the first cell is not failed. This may imply that the UE could not transmit the second report if all links associated with monitored control resource set(s) in the first cell is failed In one embodiment, the UE could be configured with a second reporting configuration. The UE could transmit the second report based on the second reporting configuration. The second report could be per cell. In one embodiment, the second report may not comprise the index (e.g. RS index) related to a failed link, if any. Furthermore, the second report may not comprise the quality value related to a failed link, if any. In addition, the second report may not comprise the quality value related to a failed link, wherein the quality is set to the predetermined value.

In one embodiment, the UE could report a measured result of a second set of resources in the second report, a quality value related to the measured result of the second set of resources indicated by (resource) index, and/or a quality value related to the measured result of the second set of resources indicated in resource configuration. In one embodiment, the second report could be for reporting measured quality of downlink reference signals. The second set of resource may comprise a set of CSI-RS resources, and/or SS/PBCH blocks. In one embodiment, the second report may be for normal beam reporting. The measured result in the second report may comprise RSRP derived or measured from the second set of resources.

In one embodiment, the first report and the second report may have the same format structure (e.g. bit width/length of the index, hit width/length of the quality value, or number of reported link). The first report and the second report could be transmitted in a same uplink resource. The UE may not transmit a request or a preamble on PRACH resource if all links associated with monitored control resource set(s) in the first cell are failed. The first report may be transmitted via physical uplink control channel. The second report may be transmitted via physical uplink control channel.

In one embodiment, if the number of links associated with monitored control resource set(s) in the first cell are less than the allowed number of reported links in the first report, the UE could report at least a candidate link in the first report. The candidate link could be used to replace one of the failed links in the first cell. The UE could report a (resource) index related to the candidate link in the first report, and/or a quality value related to the candidate link in the first report.

In one embodiment, the first set of resources could be transmitted in the first cell and/or the second cell. In one embodiment, the first set of resources could be transmitted in the second cell, and not in the first cell. In one embodiment, the first set of resources could be transmitted in primary cell. The second set of resources could be transmitted in the first cell and/or the second cell. In one embodiment, the second set of resources could be transmitted in the second cell, and not in the first cell. The second set of resources could transmitted in primary cell.

In one embodiment, the first cell could be a secondary cell. The second cell could be a primary cell. The UE may transmit a request or a preamble on PRACH resource if all links associated with monitored control resource set(s) in the second cell are failed. The uplink resource for reporting could refer to frequency domain resource, time domain resource, code domain resource, or spatial domain resource. In one embodiment, the UE could transmit the uplink resource in the second cell. Furthermore, the UE could monitor or receive PDCCH in the control resource set(s).

In one embodiment, the second cell may be the reference cell of the first cell. The antenna port for receive downlink transmission in the first cell may be QCLed with downlink reference signal (resource) transmitted in the second cell, e.g. QCL respect to spatial Rx parameter. The first cell and the second cell could be secondary cells. Alternatively, the first cell could be secondary cell, and the second cell could be primary cell.

In one embodiment, the index could mean a transmission configuration indication (TCI). Association between TCI state and resource for quality measurement could be configured or indicated by higher layer.

Figure 16:
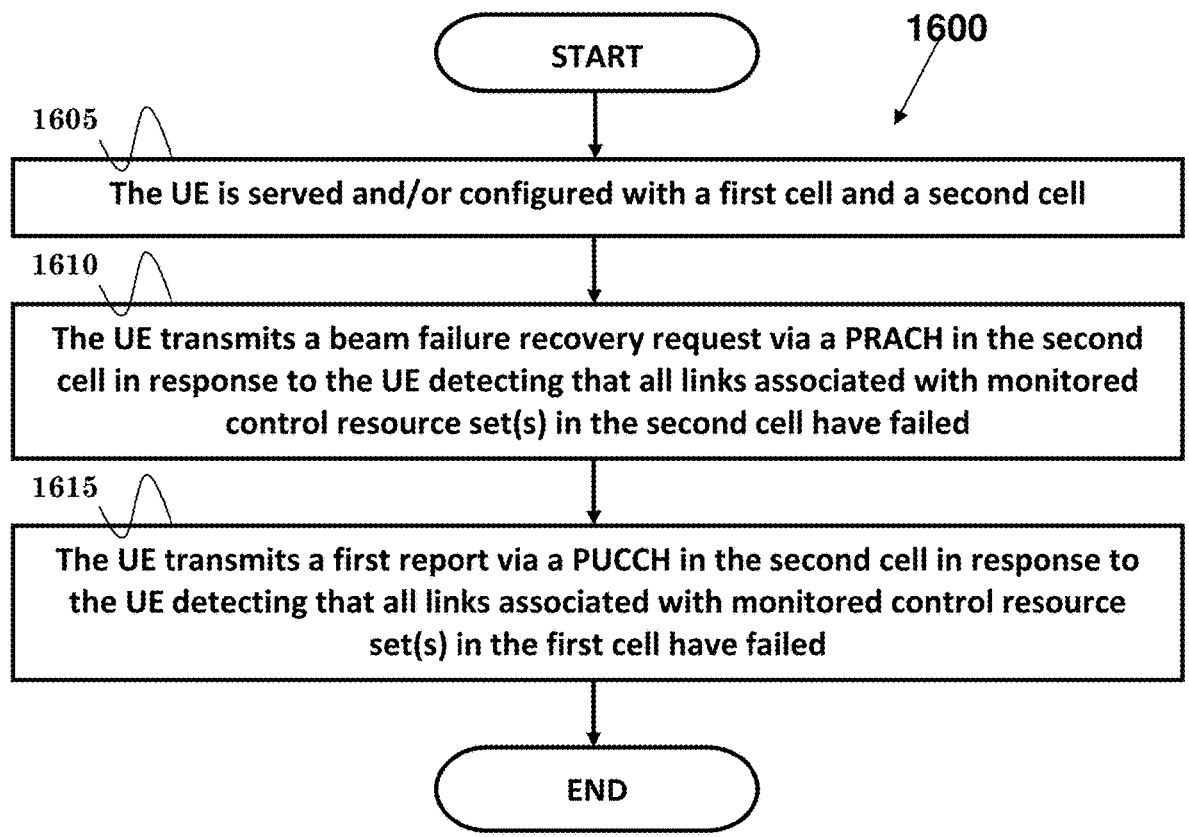
FIG. 16 a flow chart according to one exemplary embodiment.

FIG. 16 is a flow chart 1600 according to one exemplary embodiment from the perspective of a UE. In step 1605, the UE is served and/or configured with a first cell and a second cell. In step 1610, the UE transmits a beam failure recovery request via a PRACH in the second cell in response to the UE detecting that all links associated with monitored control resource set(s) in the second cell have failed. In step 1615, the UE transmits a first report via a PUCCH in the second cell in response to the UE detecting that all links associated with monitored control resource set(s) in the first cell have failed.

In one embodiment, the UE may not transmit a request or a preamble on PRACH resource if all links associated with monitored control resource set(s) in the first cell have failed.

The method of claim 1, wherein the first cell could be a secondary cell, and the second cell could be a primary cell.

In one embodiment, the UE could report a resource index related to a candidate link in the first report. The resource index could be a reference signal resource index, and the reference signal resource index comprises CSI-RS (Channel State Information Reference Signal) index and/or SSB (Synchronization Signal Block) index. The first report may comprise at least an index related to the failed links and a quality value related to the failed links.

In one embodiment, the UE may keep connecting with network via at least the second cell. The UE may transmit a second report when at least one link associated with monitored control resource set in the first cell has not failed, and the second report is for normal beam reporting for reporting measured quality of downlink reference signals. The UE may not transmit the second report when all links associated with monitored control resource set(s) in the first cell has failed. The first report and a second report may have the same format structure, and the format structure may be a bit width or length of the index, a bit width or length of the quality value, or a number of reported links.

In one embodiment, a link fails when quality of the connection between the UE and network falls below a threshold, and the quality of the connection could be RSRP (Radio Resource Control) or BLER (Block Error Rate) derived by the UE. An antenna port for receiving downlink transmission in the first cell may be QCLed (Quasi Co-Located) with downlink reference signal resources transmitted in the second cell.

Referring back to FIGS. 3 and 4, in one exemplary embodiment of a UE wherein the UE is served and/or configured with a first cell and a second cell, the device 300 includes a program code 312 stored in the memory 310. The CPU 308 could execute program code 312 to enable the UE (i) to transmit a beam failure recovery request via a PRACH in the second cell in response to the UE detecting that all links associated with monitored control resource set(s) in the second cell have failed, and (ii) to transmit a first report via a PUCCH in the second cell in response to the UE detecting that all links associated with monitored control resource set(s) in the first cell have failed. Furthermore, the CPU 308 can execute the program code 312 to perform all of the above-described actions and steps or others described herein.

Figure 17:
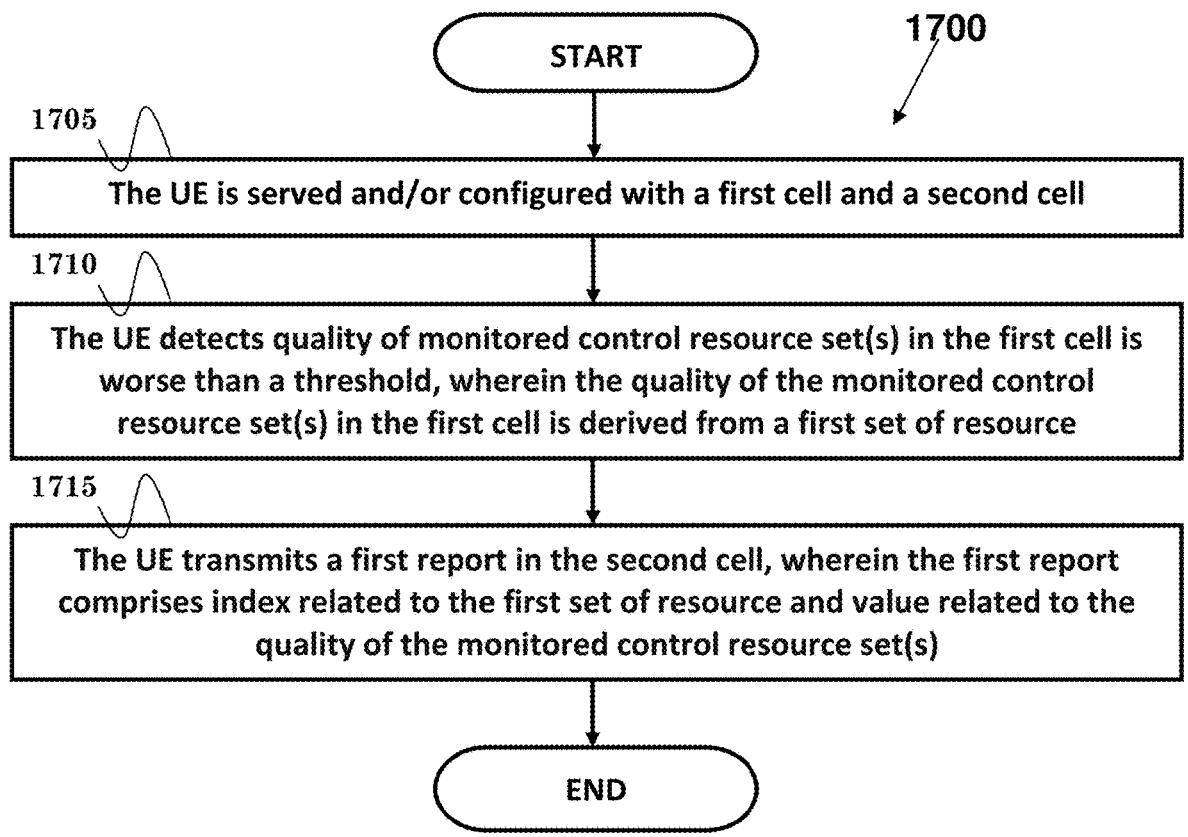
FIG. 17 is a flow chart according to one exemplary embodiment.

FIG. 17 is a flow chart 1700 according to one exemplary embodiment from the perspective of a UE. In step 1705, the UE is served and/or configured with a first cell and a second cell. In step 1710, the UE detects quality of monitored control resource set(s) in the first cell is worse than a threshold, wherein the quality of the monitored control resource set(s) in the first cell is derived from a first set of resource. In step 1715, the UE transmits a first report in the second cell, wherein the first report comprises index related to the first set of resource and value related to the quality of the monitored control resource set(s).

In one embodiment, the first set of resource may comprise a set of CSI-RS resources, or SS or PBCH blocks. The quality of monitored control resource set(s) could mean RSRP or BLER derived by the UE.

In one embodiment, the quality of all monitored control resource set(s) in the first cell could be worse than the threshold; and the UE could transmit the first report in the second cell, wherein the first report comprises index related to the all monitored control resource set(s) and value related to the quality of the all monitored control resource set(s).

The UE may not report the quality of monitored control resource set(s) in a cell other than the first cell in the first report.

Referring back to FIGS. 3 and 4, in one exemplary embodiment of a UE, wherein the UE is served or configured with a first cell and a second cell, the device 300 includes a program code 312 stored in the memory 310. The CPU 308 could execute program code 312 to enable the UE (i) to detect quality of monitored control resource set(s) in the first cell is worse than a threshold, wherein the quality of the monitored control resource set(s) in the first cell is derived from a first set of resource, and (ii) to transmit a first report in the second cell, wherein the first report comprises index related to the first set of resource and value related to the quality of the monitored control resource set(s). Furthermore, the CPU 308 can execute the program code 312 to perform all of the above-described actions and steps or others described herein.

FIG. 18 is a flow chart 1800 according to one exemplary embodiment from the perspective of a UE. In step 1805, the UE is served and/or configured with a first cell and a second cell. In step 1810, the UE detects all links associated with monitored control resource set(s) in the first cell are failed. In step 1815, the UE transmits a first report in the second cell, wherein the first report comprises at least index related to failed links and quality value related to the failed links.

In one embodiment, a link may be a connection between the UE and network (e.g. a beam pair link or a beam connection). A link fails when the quality of the connection between the UE and network falls below a threshold, such as when RSRP or BLER derived by the UE related to a beam connection is below a threshold.

In one embodiment, the UE may transmit the first report in the second cell, wherein the first report comprises at least an index related to the failed links and a quality value related to the failed links. The UE may not report failed links in a cell other than the first cell in the first report.

Referring back to FIGS. 3 and 4, in one exemplary embodiment of a UE, wherein the UE is served or configured with a first cell and a second cell, the device 300 includes a program code 312 stored in the memory 310. The CPU 308 could execute program code 312 to enable the UE (i) to detect all links associated with monitored control resource set(s) in the first cell have failed, and (ii) to transmit a first report in the second cell, wherein the first report comprises at least index related to failed links and quality value related to the failed links. Furthermore, the CPU 308 can execute the program code 312 to perform all of the above-described actions and steps or others described herein.

In the context of the embodiments illustrated in FIGS. 17 and 18, and discussed above, in one embodiment, the UE may keep connecting with network via at least the second cell. The first report may be per cell. Furthermore, the first report may comprise one or more indices related to the failed links, and one or more quality values related to the failed links. The quality value may be set to a predetermined value in the first report. The predetermined value may be the allowed minimum quality value to report. The quality value may be in units of dBm, and may be related to RSRP. In one embodiment, if the BLER related to a link is below a threshold, the UE may set the quality value of the link as the predetermined value in the first report even though RSRP related to the link is larger than the predetermined value.

In one embodiment, the index may be a RS resource index. The UE could be configured with a first reporting configuration, and the UE could transmit the first report based on the first reporting configuration. The UE could also transmit a second report if at least one link associated with monitored control resource set in the first cell is not failed. In addition, the UE could be configured with a second reporting configuration, and the UE could transmit the second report based on the second reporting configuration.

In one embodiment, the second report could be per cell. The second report may not comprise the index (e.g. RS index) related to a failed link, if any. Furthermore, the second report may not comprise the quality value related to a failed link, if any. In addition, the second report may not comprise the quality value related to a failed link, wherein the quality is set to the predetermined value.

In one embodiment, the UE may report a measured result of a second set of resources in the second report, a quality value related to the measured result of the second set of resources indicated by (resource) index, and/or a quality value related to the measured result of the second set of resources indicated in resource configuration. In one embodiment, the second report may be for reporting measured quality of downlink reference signals, and may comprise a set of CSI-RS resources or SS/PBCH blocks. Alternatively, the second report may be for normal beam reporting.

In one embodiment, the measured result of the second set of resources in the second report may comprise RSRP derived from the second set of resources. The first report and the second report have the same format structure (e.g. bit width/length of the index, bit width/length of the quality value, or number of reported link). The first report and the second report may be transmitted in a same uplink resource.

In one embodiment, the UE may not transmit a request or a preamble on PRACH resource if all links associated with monitored control resource set(s) in the first cell are failed. The first report may be transmitted via physical uplink control channel. The second report may be transmitted via physical uplink control channel.

In one embodiment, if the number of links associated with monitored control resource set(s) in the first cell are less than the allowed number of reported links in the first report, the UE may report at least a candidate link in the first report. The candidate link may be used to replace one of the failed links in the first cell. The UE may report (resource) index related to the candidate link in the first report, and/or a quality value related to the candidate link in the first report.

In one embodiment, the first set of resources may be transmitted in the first cell and/or the second cell. Alternatively, the first set of resources may be transmitted in the second cell, and not in the first cell. In addition, the first set of resources may be transmitted in a primary cell.

In one embodiment, the second set of resources may be transmitted in the first cell and/or in the second cell. In particular, the second set of resources may be transmitted in the second cell, and not in the first cell. The second set of resources may be transmitted in primary cell.

In one embodiment, the first cell may be a secondary cell, and the second cell may be a primary cell. The uplink resource for reporting may refer to frequency domain resource, time domain resource, code domain resource, or spatial domain resource.

In one embodiment, the UE may transmit the uplink resource or the physical uplink control channel in the second cell. The UE may monitor and/or receive PDCCH in the control resource set.

Figure 19:
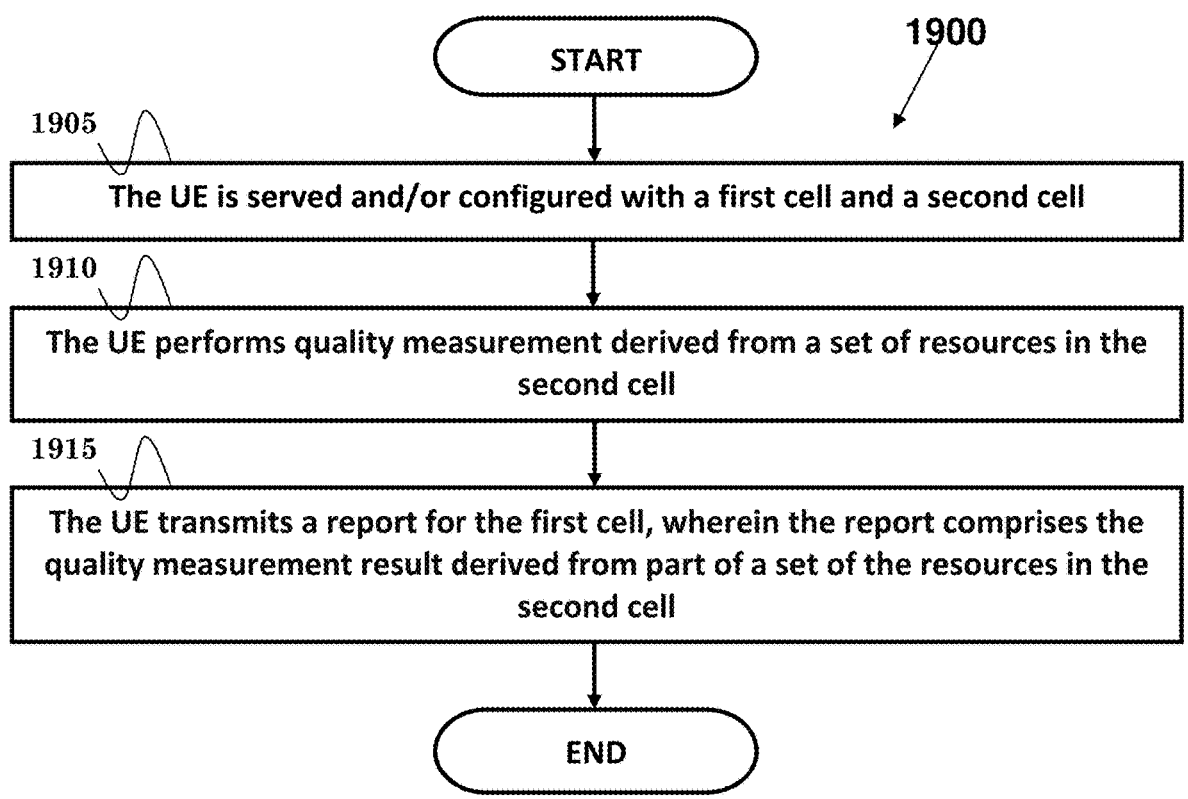
FIG. 19 is a flow chart according to one exemplary embodiment.

FIG. 19 is a flow chart 1900 according to one exemplary embodiment from the perspective of a UE. In step 1905, the UE is served and/or configured with a first cell and a second cell. In step 1910, the UE performs quality measurement derived from a set of resources in the second cell. In step 1915, the UE transmits a report for the first cell, wherein the report comprises the quality measurement result derived from part of a set of the resources in the second cell.

In one embodiment, the set of resources may comprise a set of CSI-RS resources or SS/PBCH blocks. The quality measurement result may mean RSRP or BLER derived by the UE.

In one embodiment, the report may comprise the quality measurement result related to quality of monitored control resource set in the first cell. The UE could monitor and/or receive PDCCH in the control resource set(s). The report may also comprise the quality measurement result related to the link quality in the first cell.

In one embodiment, the report may be per cell. The report may comprise an index related to the part of a set of the resources, and a quality value related to the part of a set of the resources. The report may be for beam reporting of the first cell. The report may be transmitted in the second cell.

In one embodiment, the report may be transmitted in the first cell. The first cell may be a secondary cell, and the second cell may be a primary cell.

In one embodiment, the UE may transmit the report in physical uplink control channel. The UE may be configured with resource configuration of the set of resource in the second cell.

In one embodiment, the set of resource in the second cell may be for beam measurement. In particular, the set of resource in the second cell may be for beam measurement of the second cell or the first cell. The quality measurement of the part of the set of resource in the second cell may refer to beam status of the first cell.

In one embodiment, the UE may transmit the report based on reporting configuration of the first cell. The reporting configuration may be linked to the resource configuration for L1-RSRP computation or beam measurement, or to resources indicated in the resource configuration for L1-RSRP computation or beam measurement. The reporting configuration may comprise at least time domain behavior of the report. The report may correspond to a measured quality or measurement result after receiving and/or measuring the resource(s) indicated in the resource configuration.

In one embodiment, the QCL assumption for receiving one of any downlink transmission in the first cell is referred to the resource configuration of the set of resource in the second cell. The antenna port(s) for receiving one of any downlink transmission in the first cell may be quasi co-located with one of any downlink resources transmitted in the second serving cell.

In one embodiment, the UE may use the same spatial TX parameters to transmit one of any uplink transmission in the second cell as that to transmit one of any uplink transmission in the first cell. The UE may be configured with a higher layer parameter for QCL indication in the second cell. The higher layer parameter may be associated with one of any downlink reference signal transmitted in the second cell where the higher layer parameter is configured.

In one embodiment, the UE may receive any downlink transmissions based on the higher layer parameter configured in the second cell. The UE may not be configured with the high layer parameter in the first serving cell.

Referring back to FIGS. 3 and 4, in one exemplary embodiment of a UE, wherein the UE is served and/or configured with a first cell and a second cell, the device 300 includes a program code 312 stored in the memory 310. The CPU 308 could execute program code 312 to enable the UE (i) to perform quality measurement derived from a set of resources in the second cell, and (ii) to transmit a report for the first cell, wherein the report comprises the quality measurement result derived from part of a set of the resources in the second cell. Furthermore, the CPU 308 can execute the program code 312 to perform all of the above-described actions and steps or others described herein.

Figure 20:
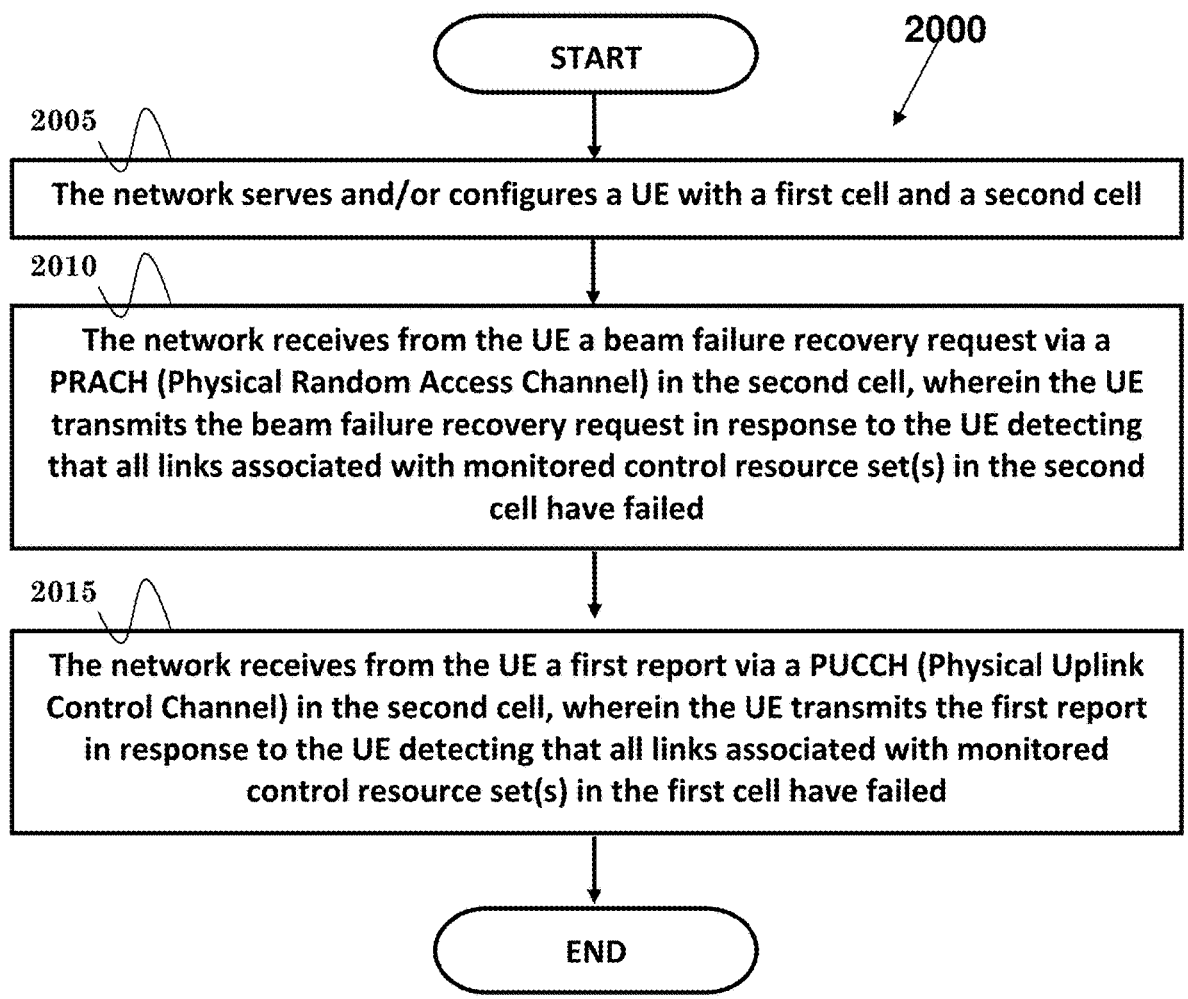
FIG. 20 is a flow chart according to one exemplary embodiment.

FIG. 20 is a flow chart 2000 according to one exemplary embodiment from the perspective of a network. In step 2005, the network serves and/or configures a UE with a first cell and a second cell. In step 2010, the network receives from the UE a beam failure recovery request via a PRACH (Physical Random Access Channel) in the second cell, wherein the UE transmits the beam failure recovery request in response to the UE detecting that all links associated with monitored control resource set(s) in the second cell have failed. In step 2015, the network receives from the UE a first report via a PUCCH (Physical Uplink Control Channel) in the second cell, wherein the UE transmits the first report in response to the UE detecting that all links associated with monitored control resource set(s) in the first cell have failed.

Referring back to FIGS. 3 and 4, in one exemplary embodiment of a network, the device 300 includes a program code 312 stored in the memory 310. The CPU 308 could execute program code 312 to enable the UE (i) to serve and/or configures a UE with a first cell and a second cell, (ii) to receive from the UE a beam failure recovery request via a PRACH (Physical Random Access Channel) in the second cell, wherein the UE transmits the beam failure recovery request in response to the UE detecting that all links associated with monitored control resource set(s) in the second cell have failed, and (iii) to receive from the UE a first report via a PUCCH (Physical Uplink Control Channel) in the second cell, wherein the UE transmits the first report in response to the UE detecting that all links associated with monitored control resource set(s) in the first cell have failed. Furthermore, the CPU 308 can execute the program code 312 to perform all of the above-described actions and steps or others described herein.

In one embodiment, the network does not receive from the UE a request or a preamble on PRACH resource. In one embodiment, the UE transmits the request or the preamble in response to the UE detecting all links associated with monitored control resource set(s) in the first cell have failed.

In one embodiment, the first cell is a secondary cell and the second cell is a primary cell.

In one embodiment, the network receives a resource index related to a candidate link in the first report. In one embodiment, the resource index is a reference signal resource index, and the reference signal resource index comprises CSI-RS (Channel State Information Reference Signal) index and/or SSB (Synchronization Signal Block) index.

In one embodiment, the first report comprises at least an index related to the failed links and a quality value related to the failed links.

In one embodiment, the network keeps connecting with the UE via at least the second cell.

In one embodiment, the network receives a second report from the UE, wherein the second report is transmitted when at least one link associated with monitored control resource set in the first cell has not failed, and the second report is for normal beam reporting for reporting measured quality of downlink reference signals.

In one embodiment, the network receives the second report from the UE, wherein the second report is not transmitted when all links associated with monitored control resource set(s) in the first cell has failed.

In one embodiment, the first report and the second report have the same format structure, and the format structure is related to one or more of the followings: a bit width or length of the index, a bit width or length of the quality value, or a number of reported links.

In one embodiment, a link fails when quality of the connection between the UE and the network falls below a threshold, and the quality of the connection is RSRP (Radio Resource Control) or BLER (Block Error Rate) derived by the UE.

In one embodiment, the network transmits to the UE downlink transmission in the first cell and downlink reference signal resources in the second cell, wherein the antenna port for receiving transmitted downlink transmission is QCLed (Quasi Co-Located) with that for receiving transmitted downlink reference signal resources.

In one embodiment, the first cell and the second cell may be secondary cells. Alternatively, the first cell may be a secondary cell, and the second cell may be a primary cell.

In one embodiment, the index may mean a transmission configuration indication (TCI). An association between TCI state and resource for quality measurement may be configured and/or indicated by a higher layer.

In the context of the embodiments shown in FIGS. 17-20 and discussed above, in one embodiment, the second cell may be a reference cell of the first cell. The antenna port for receive downlink transmission in the first cell may be QCLed with downlink reference signal (resource) transmitted in the second cell.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment), comprising:
the UE is served and/or configured with a first cell and a second cell by a network;
the UE transmits a beam failure recovery request via a PRACH (Physical Random Access Channel) in the second cell in response to the UE detecting that all links associated with monitored control resource set(s) in the second cell have failed, and
the UE transmits a first report via a PUCCH (Physical Uplink Control Channel) in the second cell in response to the UE detecting that all links associated with monitored control resource set(s) in the first cell have failed.

2. The method of claim 1, wherein the UE does not transmit a request or a preamble on PRACH resource in response to the UE detecting all links associated with monitored control resource set(s) in the first cell have failed.

3. The method of claim 1, wherein the first cell is a secondary cell and the second cell is a primary cell.

4. The method of claim 1, wherein the first report comprises a resource index related to a candidate link, wherein the resource index is a reference signal resource index, and the reference signal resource index comprises CSI-RS (Channel State Information Reference Signal) index and/or SSB (Synchronization Signal Block) index; or
wherein the first report comprises at least an index related to the failed links and a quality value related to the failed links.

5. The method of claim 1, wherein the first report includes a beam failure report transmitted via the PUCCH, or wherein the PUCCH is used for beam failure recovery request transmission.

6. The method of claim 1, wherein the UE keeps connecting with the network via at least the second cell.

7. The method of claim 1, wherein the UE transmits a second report when at least one link associated with monitored control resource set in the first cell has not failed, and the second report is for normal beam reporting for reporting measured quality of downlink reference signals.

8. The method of claim 7, wherein the UE does not transmit the second report when all links associated with monitored control resource set(s) in the first cell has failed.

9. The method of claim 7, wherein the first report and the second report have the same format structure, and the format structure is related to one or more of the followings: a bit width or length of the index, a bit width or length of the quality value, or a number of reported links.

10. The method of claim 1, wherein a link is a connection between the UE and the network, and the link fails when the quality of the connection, which is RSRP (Radio Resource Control) or BLER (Block Error Rate) derived by the UE, falls below a threshold.

11. The method of claim 1, wherein an antenna port for receiving downlink transmission in the first cell is QCLed (Quasi Co-Located) with that for receiving downlink reference signal resources transmitted in the second cell.

12. A User Equipment (UE) wherein the UE is served and/or configured with a first cell and a second cell, comprising:
a control circuit;
a processor installed in the control circuit; and
a memory installed in the control circuit and operatively coupled to the processor;
wherein the processor is configured to execute a program code stored in the memory to:
transmit a beam failure recovery request via a PRACH (Physical Random Access Channel) in the second cell in response to the UE detecting that all links associated with monitored control resource set(s) in the second cell have failed, and
transmit a first report via a PUCCH (Physical Uplink Control Channel) in the second cell in response to the UE detecting that all links associated with monitored control resource set(s) in the first cell have failed.

13. The UE of claim 12, wherein the UE does not transmit a request or a preamble on PRACH resource if all links associated with monitored control resource set(s) in the first cell have failed.

14. The UE of claim 12, wherein the first cell is a secondary cell and the second cell is a primary cell.

15. The UE of claim 12, wherein the first report comprises a resource index related to a candidate link, wherein the resource index is a reference signal resource index, and the reference signal resource index comprises CSI-RS (Channel State Information Reference Signal) index and/or SSB (Synchronization Signal Block) index; or
wherein the first report comprises at least an index related to the failed links and a quality value related to the failed links.

16. The UE of claim 12, wherein the first report includes a beam failure report transmitted via the PUCCH, or wherein the PUCCH is used for beam failure recovery request transmission.

17. The UE of claim 12, wherein the UE keeps connecting with network via at least the second cell.

18. The UE of claim 12, wherein the UE transmits a second report when at least one link associated with monitored control resource set in the first cell has not failed, and the second report is for normal beam reporting for reporting measured quality of downlink reference signals, and wherein the first report and a second report have the same format structure, and the format structure is related to one or more of the followings: a bit width or length of the index, a bit width or length of the quality value, or a number of reported links.

19. The UE of claim 12, wherein a link is a connection between the UE and the network, and the link fails when the quality of the connection, which is RSRP (Radio Resource Control) or BLER (Block Error Rate) derived by the UE, falls below a threshold.

20. The UE of claim 12, wherein an antenna port for receiving downlink transmission in the first cell is QCLed (Quasi Co-Located) with downlink reference signal resources transmitted in the second cell.

* * * * *